US012799142B2

(12) United States Patent
Lu et al.

(10) Patent No.: US 12,799,142 B2
(45) Date of Patent: Nov. 17, 2026

(54) ORGANOBORON COMPOUND, ITS PREPARATION AND USE

(71) Applicant: City University of Hong Kong, Kowloon (HK)

(72) Inventors: Zhenpin Lu, Kowloon (HK); Haokun Li, Kowloon (HK)

(73) Assignee: City University of Hong Kong, Kowloon (HK)

( * ) Notice: Subject to any disclaimer, the term of this patent is extended or adjusted under 35 U.S.C. 154(b) by 259 days.

(21) Appl. No.: 18/788,711

(22) Filed: Jul. 30, 2024

(65) Prior Publication Data

US 2025/0188097 A1 Jun. 12, 2025

Related U.S. Application Data

(60) Provisional application No. 63/608,397, filed on Dec. 11, 2023.

(51) Int. Cl.
*C07F 5/02* (2006.01)

(52) U.S. Cl.
CPC .................................... *C07F 5/027* (2013.01)

(58) Field of Classification Search
CPC ........................................................ C07F 5/027
See application file for complete search history.

(56) References Cited

PUBLICATIONS

Wittig, G. et al. Über metallorganische Komplexverbindungen. Naturwissenschaften 34, 216 (1947).
Nishida, H. et al. Tetrakis(3,5-bis(trifluoromethyl)phenyl)borate. Highly lipophilic stable anionic agent for solvent-extraction of cations. Bull. Chem. Soc. Jpn 57, 2600-2604 (1984).
Kobayashi, H. et al. Tetrakis[3,5-di(F-methyl)phenyl] borate as the first efficiently negatively charged phase transfer catalyst. Kinet. Evid. Chem. Lett. 10, 579-580 (1981).
Riddlestone, I. M. et al. Taming the cationic beast: novel developments in the synthesis and application of weakly coordinating anions. Angew. Chem. Int. Ed. 57, 13982-14024 (2018).
Music, A. et al. Electrochemical synthesis of biaryls via oxidative intramolecular coupling of tetra (hetero) arylborates. J. Am. Chem. Soc. 142, 4341-4348 (2020).
Gerleve, C. et al. Transition-metal-free oxidative cross-coupling of tetraarylborates to biaryls using organic oxidants. Angew. Chem. Int. Ed. 59, 15468-15473 (2020).
August, D. P. et al. Maximizing coordination capsule—guest polar interactions in apolar solvents reveals significant binding. Angew. Chem. Int. Ed. 55, 15022-15026 (2016).
Lu, Z. et al. A Zn4L6 capsule with enhanced catalytic C—C bond formation activity upon C60 binding. Angew. Chem. Int. Ed. 58, 9073-9077 (2019).
Xu, L. et al. Naphthalene diimide-and perylene diimide-based supramolecular cages. Mater. Chem. Front. 4, 3176-3189 (2020).
Popielarz, R. et al. Applicability of tetraphenylborate salts as free radical initiators. Macromolecules 31, 951-954 (1998).
Aldroubi, S. et al. Tailored imidazolium tetraphenylborate salts for the design of boron, nitrogen co-doped carbon materials as highperformance anodes for fast-rate monovalent ion batteries. J. Mater. Chem. A 11, 16755-16766 (2023).
Shin, D.-M. et al.Asingle-ion conducting borate networkpolymer as a viable quasi-solid electrolyte for lithium metal batteries. Adv. Mater. 32, 1905771 (2020).
Astruc, D. Electron-transfer processes in dendrimers and their implication in biology, catalysis, sensing and nanotechnology. Nat. Chem. 4, 255-267 (2012).
Ma, M. et al. Bio-inspired polymer composite actuator and generator driven by water gradients. Science 339, 186-189 (2013).
Peters, G. M. et al. G4-quartet•M+ borate hydrogels. J. Am. Chem. Soc 137, 5819-5827 (2015).
Beil, S. B. et al. Electrochemical instability of highly fluorinated tetraphenyl borates and syntheses of their respective biphenyls. Chem. Commun. 54, 6128-6131 (2018).
Kaes, C. et al. Bipyridine: the most widely used ligand. A review of molecules comprising at least two 2, 2 '-bipyridine units. Chem.Rev. 100, 3553-3590 (2000).
Schubert, U. S. & Eschbaumer, C. Macromolecules containing bipyridine and terpyridine metal complexes: towards metallosupramolecular polymers. Angew. Chem. Int. Ed. 41, 2892-2926 (2002).
Ye, B. -H.et al. Metal-organic molecular architectures with 2, 2'-bipyridyl-like and carboxylate ligands. Coord. Chem. Rev. 249, 545-565 (2005).
Malkov, A. V. & Kocovsky, P. Chiral bipyridine derivatives in asymmetric catalysis. Curr. Org. Chem. 7, 1737-1757 (2003).
Biani, F. F. et al. Multistep redox processes and intramolecular charge transfer in ferrocene-based 2, 2 '-bipyridylboronium salts. Organometallics 16, 4776-4787 (1997).
Ma, K. et al. Electronic communication in a series of novel multistep redox systems. Organometallics 21, 3979-3989 (2002).
Scheibitz, M. et al. Electronic interactions in oligoferrocenes with cationic, neutral and anionic four-coordinate boron bridges. Dalton Trans. 34, 159-170 (2005).
Wood, T. K. et al. Spirocyclic boronium ions: precursors to persistent neutral radicals. Chem. Commun. 2009, 5147-5149 (2009).
Rosch, B. et al. Strongly reducing magnesium (0) complexes. Nature 592, 717-721 (2021).
Liu, H.-Y. et al. Reduction of Na+ within a {Mg2Na2} assembly. Angew. Chem. Int. Ed. 62, e20221360 (2023).
Davison, N. et al. Reduction of K+ or Li+ in the heterobimetallic electride K+[LiN(SiMe3)2]e—. J. Am. Chem. Soc 145, 17007-17012 (2023).
Pearce, K. G. et al. Alkalimetal reduction of alkalimetal cations. Nat. Commun. 14, 8147 (2023).
Mansell, S. M. et al. Boron-nitrogen analogues of the fluorenyl anion. Dalton Trans. 39, 5084-5086 (2010).
Liu, S. et al. 2, 2'-Bipyridyl as a redox-active borylene abstraction agent. Inorg. Chem. 59, 10866-10873 (2020).
Rosenzweig, M. W. et al. Molecular and electronic structures of eight-coordinate uranium bipyridine complexes: a rare example of a Bipy2-ligand coordinated to a U4+ ion. Inorg. Chem. 56, 2792-2800 (2017).

(Continued)

*Primary Examiner* — Bruck Kifle
(74) *Attorney, Agent, or Firm* — Renner, Kenner, Greive, Bobak, Taylor & Weber

(57) ABSTRACT

An organoboron compound for reductive synthesis includes a structure of Formula (I). A method for preparing the organoboron compound includes providing a first precursor having a structure of Formula (IV), with $R_1$ and $R_2$ each being the mono-, di or tri substitution, and converting the first precursor into the organoboron compound.

15 Claims, 50 Drawing Sheets

(56) References Cited

PUBLICATIONS

Wang, D. et al. Experimental and computational studies on a basefree terminal uranium phosphinidene metallocene. Chem. Eur. J. 26, 16888-16899 (2020).
Carver, C. T. et al. Coupling of aromatic N-heterocycles mediated by group 3 complexes. Organometallics 29, 835-846 (2010).
Yahia, A. et al. C—C coupling reaction of pyridine derivatives at the dimethyl rare-earth metal cation [YMe2(THF)5]+: A DFT investigation. J. Organomet. Chem. 695, 2789-2793 (2010).
Kurogi, T. et al. Room temperature olefination of methane with titanium-carbon multiple bonds. Chem. Sci. 9, 3376-3385 (2018).
Fedushkin, I. L. et al. Ytterbium and europium complexes of redoxactive ligands: searching for redox isomerism. Inorg. Chem. 56, 9825-9833 (2017).
Fallah-Bagher-Shaidaei, H. et al. Which NICS aromaticity index for planar π rings is best? Org. Lett. 8, 863-866 (2006).
Lu, T. & Chen, F. Multiwfn: a multifunctional wavefunction analyzer. J. Comput. Chem. 33, 580-592 (2012).
Dodds, D. L. et al. Stereospecific diphosphination of activated acetylenes: a general route to backbone-functionalized, chelating 1,2-diphosphinoethenes. Organometallics 25, 5937-5945 (2006).
Ye, J. et al. Ready approach to organophosphines from ArCl via selective cleavage of C—P bonds by sodium. Organometallics 39,2682-2694 (2020).
Branfoot, C. et al. Radical-initiated P,P-metathesis reactions of diphosphanes: evidence from experimental and computational studies. Dalton Trans. 50, 7094-7104 (2021).
Elangovan, S. et al. Cationic cobalt-thiolate complexes for the dehydrogenative coupling of nBu3SnH. Organometallics 41, 852-857 (2022).
Davison, N. et al. A room-temperature-stable electride and its reactivity: Reductive benzene/pyridine couplings and solvent-free Birch reductions. Chemistry 9, 576-591 (2023).
Grotthuss, Evon et al. Selective CO2 splitting by doubly reduced aryl boranes to give CO and [CO3]2—. Angew. Chem. Int. Ed. 57, 16491-16495 (2018).
Ishizuka, T. et al. Self-photosensitizing dinuclear ruthenium catalyst for CO2 reduction to CO. J. Am. Chem. Soc. 145, 23196-23204 (2023).
Lee, S. K. et al. Function-integrated Ru catalyst for photochemical CO2 reduction. J. Am. Chem. Soc. 140, 16899-16903 (2018).
Kamada, K. et al. Photocatalytic CO2 reduction using a robust multifunctional iridium complex toward the selective formation of formic acid. J. Am. Chem. Soc. 142, 10261-10266 (2020).
Fulmer,. G. R., Miller, A. J. M., Sherden, N. H., Gottlieb, H. E., Nudelman, A., Stoltz, B. M., Bercaw, J. E., Goldberg, K. I. NMR Chemical Shifts of Trace Impurities: Common Laboratory Solvents, Organics, and Gases in Deuterated Solvents Relevant to the Organometallic Chemist. Organometallics 29, 2176-2179 (2010).
Leng, T., Wu, G., Zhou, Y. B., Gao, W., Ding, J., Huang, X., Liu, M., Wu, H. Silver-Catalyzed One-Pot Three-Component Selective Synthesis of β-Hydroxy Selenides. Adv. Synth. Catal. 360, 4336-4340 (2018).
Guan, W. Lu, L., Jiang, Q., Gittens, A. F., Wang, Y., Novaes, L. F. T., Klausen, R. S., Lin, S. An Electrochemical Strategy to Synthesize Disilanes and Oligosilanes from Chlorosilanes. Angew. Chem. Int. Ed. 62, e202303592 (2023).
Stoll, S., Schweiger, A. EasySpin, a comprehensive software package for spectral simulation and analysis in EPR. J. Magn. Reson. 178, 42-55 (2006).
Trivedi, M. K., Tallapragada, R. M., Branton, A., Trivedi, D., Nayak, G., Latiyal, O., Jana, S. Physical, Atomic and Thermal Properties of Biofield Treated Lithium Powder. J. Adv. Chem. Eng. 5, hal-01491589 (2015).
Neese, F. The ORCA program system. Wiley Interdiscip. Rev.: Comput. Mol. 2, 73-78 (2011).
Neese, F. Software update: The ORCA program system—Version 5.0. Wiley Interdiscip. Rev.: Comput. Mol. 12, e1606 (2022).
Zhao, Y. & Truhlar, D. G. The M06 suite of density functionals for main group thermochemistry, thermochemical kinetics, noncovalent interactions, excited states, and transition elements: two new functionals and systematic testing of four M06-class functionals and 12 other functionals. Theor. Chem. Acc. 120, 215-241 (2008).
Weigend, F. & Ahlrichs, R. Balanced basis sets of split valence, triple zeta valence and quadruple zeta valence quality for H to Rn: Design and assessment of accuracy. Phys. Chem. Chem. Phys. 7, 3297-3305 (2005).
Barone, V. & Cossi, M. Quantum Calculation of Molecular Energies and Energy Gradients in Solution by a Conductor Solvent Model. J. Phys. Chem. A 102, 1995-2001 (1998).
Perdew, J. P., Ruzsinszky, A., Csonka, G. I., Constantin, L. A., Sun, J. Workhorse Semilocal Density Functional for Condensed Matter Physics and Quantum Chemistry. Phys. Rev. Lett. 103, 026403 (2009).
Jensen, F. Segmented Contracted Basis Sets Optimized for Nuclear Magnetic Shielding. J. Chem. Theory Comput. 11, 132-138 (2015).
Marenich, A. V., Cramer, C. J., Truhlar, D. G. Universal Solvation Model Based on Solute Electron Density and on a Continuum Model of the Solvent Defined by the Bulk Dielectric Constant and Atomic Surface Tensions. J. Phys. Chem. B 113, 6378-6396 (2009).
Geuenich, D., Hess, K., Kohler, K., Herges, R. Anisotropy of the Induced Current Density (ACID), a General Method to Quantify and Visualize Electronic Delocalization. Chem. Rev. 105, 3758-3772 (2005).
Santra, G., Sylvetsky, N., Martin, J. M. L., Minimally Empirical Double-Hybrid Functionals Trained against the GMTKN55 Database: revDSD-PBEP86-D4, revDOD-PBE-D4, and DOD-SCAN-D4. J. Phys. Chem. A 123, 5129-5143 (2019).
Caldeweyher, E., Bannwarth, C., Grimme, S. Extension of the D3 dispersion coefficient model. J. Chem. Phys. 147, 034112 (2017).
Caldeweyher, E., Ehlert, S., Hansen, A., Neugebauer, H., Spicher, S., Bannwarth, C., Grimme, S. A generally applicable atomic-charge dependent London dispersion correction. J. Chem. Phys. 150, 154122 (2019).

Decomposition of tetraaryl borates 4
67%

4

5
71%

6

5'

4

6

5

6

5'

6

5

6

7

6

8

| No. 序号 | Name 组份名称 | Retention time 保留时间(min) | peak area 峰面积 | concentration 浓度() | area percentage 面积百分比 | concentration percentage 浓度百分比 |
|---|---|---|---|---|---|---|
| 1 | | 1.4450 | 8.7413 | | 100.0000 | |
| sum 合计 | | | 8.7413 | 0.0000 | 100 | 0.0000 |

| No. 序号 | Name 组份名称 | Retention time 保留时间(min) | peak area 峰面积 | concentration 浓度() | area percentage 面积百分比 | concentration percentage 浓度百分比 |
|---|---|---|---|---|---|---|
| 1 | CO | 3.2067 | 411.8424 | 0.1663 | 100.0000 | 100.0000 |
| sum 合计 | | | 411.8424 | 0.1663 | 100 | 1.0000 |

| 序号 | 组份名称 | 保留时间(min) | 峰面积 | 浓度() | 面积百分比 | 浓度百分比 |
|---|---|---|---|---|---|---|
| 1 | CO | 3.2392 | 1008521.0000 | 407.3193 | 100.0000 | 100.0000 |
| 合计 | | | 1008521.0000 | 407.3193 | 100 | 1.0000 |

4

5

6

6

5

6

5'

6

7

5'

5

6

7

ORGANOBORON COMPOUND, ITS PREPARATION AND USE

TECHNICAL FIELD

The present invention relates to an organoboron compound, for example, particularly, but not exclusively, an anionic or neutral organoboron compound for reductive synthesis and the preparation for such an organoboron compound.

BACKGROUND OF THE INVENTION

The elements in Group 1 of the Periodic Table are characterized by having the lowest electronegativity values. Thus, it is believed that the chemical reduction of Group-1 metal cations $M^+$ to form their corresponding zero-valent species M(0) is exceptionally rare and represents one of the most challenging endeavors in the field of synthetic inorganic chemistry, compared to electrochemical and photochemical regimes. It is also believed that one major hurdle is the absence of a suitable reducing agent capable of surpassing the highly negative redox potential.

Attempts to achieve such a reduction reaction, such as using low-valent magnesium species, heterobimetallic electride, chloroberyllate compounds, have been reported. These reactions/approaches, however, generally require the use/presence of special ligands within the metal-containing system and/or complicated/harsh synthetic procedures.

The present invention thus seeks to eliminate or at least mitigate such shortcomings by providing a new or otherwise improved reducing agent, such as reducing agent comprising an organoboron compound for such a reductive reaction.

SUMMARY OF THE INVENTION

In a first aspect of the present invention, there is provided an organoboron compound for reductive synthesis comprising a structure of Formula (I):

Formula (I)

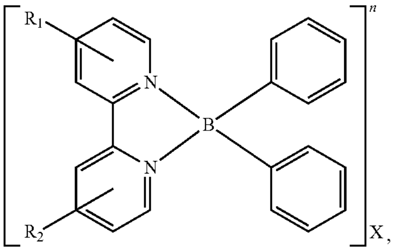

wherein $R_1$ and $R_2$ each are mono-, di- or tri-substitution; n is an integer; and X, if present, is a counterion.

Optionally, $R_1$ and $R_2$ are each independently selected from the group consisting of hydrogen, alkyl, alkoxy and a combination thereof; and with n and X as defined above.

It is optional that $R_1$ and $R_2$ are each independently selected from the group consisting of hydrogen, C1-C5 linear or branched alkyl, C1-C5 alkoxy and a combination thereof; and with n and X as defined above.

In an optional embodiment, the organoboron compound comprises a structure of Formula (IA):

Formula (IA)

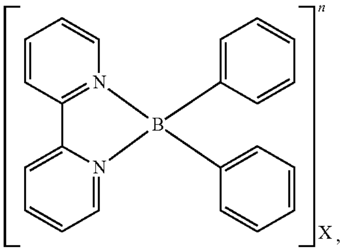

wherein n is 0 or −1; and X, if present, comprises a positive counterion.

Optionally, the organoboron compound comprises a structure of Formula (II):

Formula (II)

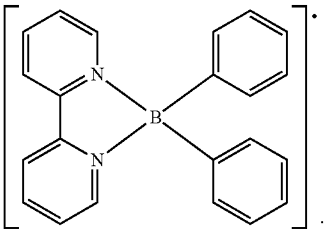

It is optional that the organoboron compound comprises a structure of Formula (III):

Formula (III)

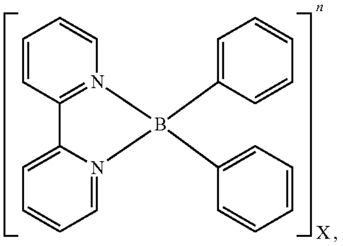

with X being the positive counterion.

In an optional embodiment, the organoboron compound comprises a structure of Formula (IIIA) or Formula (IIIB):

Formula (IIIA)

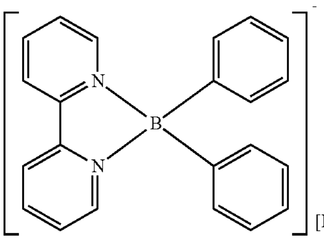

$[Li(THF)_4]^+$, or

-continued

Formula (IIIB)

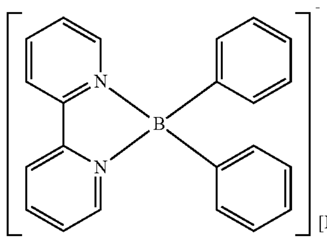

$[K(THF)_2]^+$.

Optionally, the reductive synthesis comprises any one of metallic lithium (Li(0)) formation, P—P coupling reaction, Sn—Sn coupling reaction, Se—Se coupling reaction, Ge—Ge coupling reaction, H—H coupling reaction, C—C coupling reaction, alkene reduction reaction and $CO_2$ reduction reaction.

In a second aspect of the present invention, there is provided a method for preparing an organoboron compound in accordance with the first aspect, comprising the steps of:

(a) providing a first precursor having a structure of Formula (IV):

Formula (IV)

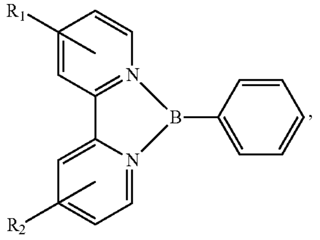

with $R_1$ and $R_2$ each being the mono-, di or tri substitution as defined above; and (b) converting the first precursor into the organoboron compound.

In an optional embodiment, the first precursor has a structure of Formula (IVA):

Formula (IVA)

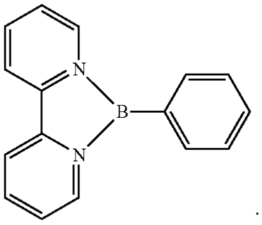

Optionally, the method comprises the step of converting the first precursor having the structure of Formula (IVA) into the organoboron compound at room temperature.

In an optional embodiment, the converting step includes stirring a first reaction mixture comprising the first precursor having the structure of Formula (IVA), phenyllithium and THF at room temperature for at least 8 hours to form the organoboron compound having the structure of Formula (II).

Optionally, the first precursor having the structure of Formula (IVA) and phenyllithium have a molar ratio of about 1:1.5.

In optional embodiment, the converting step includes stirring a second reaction mixture comprising the first precursor having the structure of Formula (IVA), phenyllithium and toluene at room temperature for at least 8 hours to form the organoboron compound having the structure of Formula (IIIA).

It is optional that the first precursor having the structure of Formula (IVA) and phenyllithium have a molar ratio of about 1:1.

Optionally, the converting step further includes stirring a third reaction mixture comprising the organoboron compound having the structure of Formula (IIIA) and toluene at room temperature for at least 8 hours to form the organoboron compound having the structure of Formula (II).

In an optional embodiment, the converting step includes stirring a fourth reaction mixture comprising the organoboron compound having the structure of Formula (II), potassium and THF at room temperature for at least 8 hours to form the organoboron compound having the structure of Formula (IIIB).

Optionally, the organoboron compound having the structure of Formula (II) and potassium have a molar ratio of about 1:2.

In optional embodiment, the organoboron compound having the structure of Formula (IIIB) is reversibly convertible to the organoboron compound having the structure of Formula (II).

Optionally, the organoboron compound having the structure of Formula (IIIB) is reversibly converted to the organoboron compound having the structure of Formula (II) when the organoboron compound having the structure of Formula (IIIB) is heated in toluene at a temperature of about 70° C. to about 80° C. for at least 8 hours.

BRIEF DESCRIPTION OF DRAWINGS

The invention will now be more particularly described, by way of example only, with reference to the accompanying drawings, in which.

DETAILED DESCRIPTION OF OPTIONAL EMBODIMENT

As used herein, the forms "a", "an", and "the" are intended to include the singular and plural forms unless the context clearly indicates otherwise.

The words "example" or "exemplary" used in this invention are intended to serve as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A, X employs B, or X employs both A and B, then "X employs A or B" is satisfied under any of the foregoing instances.

As used herein, the phrase "about" is intended to refer to a value that is slightly deviated from the value stated herein. Various examples have been described throughout the present disclosure.

Figure 1:
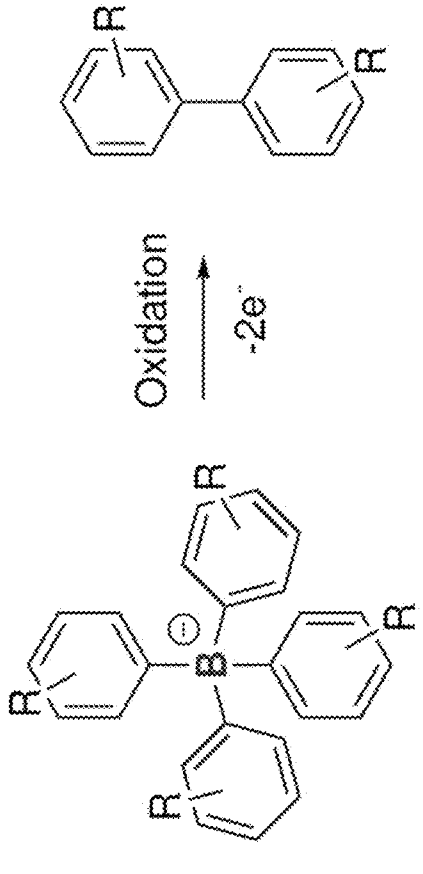
FIG. 1 is a schematic diagram illustrating the decomposition of tetraaryl borates.

It is believed that tetraaryl borate anions are stable under ambient air conditions. However, they are not redox-active species since the corresponding boron radical and cation species are unstable and decompose under oxidizing conditions, leading to the formation of biphenyl products (FIG. 1).

It is believed that installation of a non-innocent ligand at the boron atom may endow the corresponding borate anion desired redox properties.

Without wishing to be bound by theory, the inventors have, through their own research, trials, and experiments, devised that by employing bipyridine as the non-innocent ligand to the boron center, the bipyridine-coordinated borate anion would show a robust reduction ability and can realize a reduction of $Li^+$ into the corresponding elemental metallic species, forming the boron radical. It is also devised that such a bipyridine-coordinated borate anion could undergo two-electron transfer to generate the corresponding boronium. It is further devised that, in some embodiments, the bipyridine-coordinated borate anion may mediate reductive homo-coupling reactions of organohalides, enabling the formation of P—P, Sn—Sn, Se—Se, and Ge—Ge bonds, and in some other embodiments, the bipyridine-coordinated borate anion may facilitate reductive pyridine coupling, the reduction of acridine and the catalytic two-electron reduction of $CO_2$ to CO.

In a first aspect of the present invention, there is provided an organoboron compound for reductive synthesis comprising a structure of Formula (I):

Formula (I)

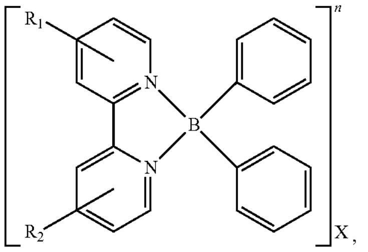

wherein $R_1$ and $R_2$ each are mono-, di- or tri-substitution; n is an integer; and X, if present, is a counterion. In some embodiments, $R_1$ and $R_2$ may be each independently selected from the group consisting of hydrogen, alkyl, alkoxy and a combination thereof.

The alkyl group may be linear or branched, and may be with 1-10 carbon atoms such as 1-5 carbon atoms (i.e., C1-C5 linear or branched alkyl). Examples of C1-C5 linear alkyl groups may include methyl, ethyl, propyl, butyl, pentyl. Examples of C1-10 branched alkyl groups may include isopropyl, n-butyl, isobutyl, sec-butyl, tert-butyl, n-pentyl (amyl), tert-pentyl, neopentyl, isopentyl (isoamyl), sec-pentyl, 3-pentyl, sec-isopentyl, active pentyl and the like.

The alkoxy group may be an alkyl group as described herein which is singularly bonded to oxygen. Examples may include methoxy, ethoxy, propoxy, butoxy, pentoxy, isopropoxy, n-butoxy, isobutoxy, sec-butoxy, tert-butoxy, n-pentoxy, tert-pentoxy, neopentoxy, isopentoxy, sec-pentoxy, 3-pentoxy, sec-isopentoxy and the like.

In some particular embodiments, the $R_1$ and $R_2$ may be identical and may be hydrogen. In these particular embodiments, the organoboron compound may comprise a structure of Formula (IA):

Formula (IA)

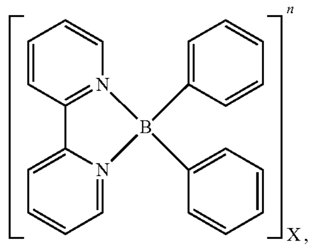

wherein n is 0 or −1; and X, if present, comprises a positive counterion.

In some embodiments where n is 0, the organoboron compound may be a radical and may comprise a structure of Formula (II):

Formula (II)

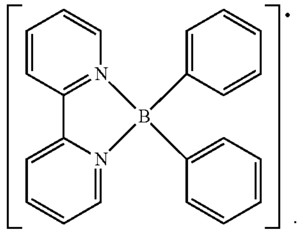

In some embodiments where n is −1, the organoboron compound may comprise a structure of Formula (III):

Formula (III)

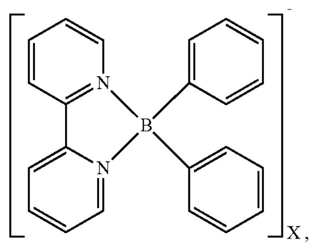

with X being the positive counterion.

The positive counterion may be a cation comprising group I elements such as Li, Na, K, Cs, and the like. In particular, depending on the solvent used upon synthesis, the group I element may be surrounded by and coordinated with the solvent molecules. In an example embodiment where THF was used as the synthetic solvent, the positive counterion may include a group I element being surrounded by and coordinated with THF molecules.

In some particular embodiments, the organoboron compound may comprise a structure of Formula (IIIA) or Formula (IIIB):

Formula (IIIA)

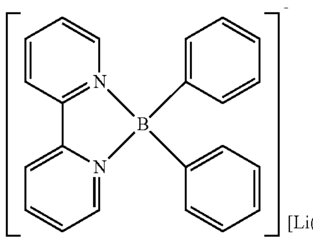

$[Li(THF)_4]^+$, or

Formula (IIIB)

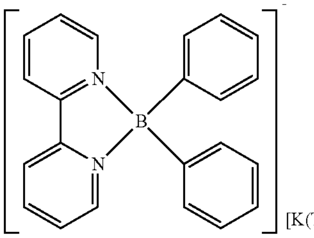

$[K(THF)_2]^+$.

As mentioned, it is believed that the organoboron compounds of the present invention are particularly useful in reductive synthesis. Examples of such a synthesis may comprise any one of metallic lithium (Li(0)) formation, P—P coupling reaction, Sn—Sn coupling reaction, Se—Se coupling reaction, Ge—Ge coupling reaction, H—H coupling reaction, C—C coupling reaction, alkene reduction reaction and $CO_2$ reduction reaction. Detailed application of the organoboron compounds in the above reductive reaction will be discussed in the later part of the present disclosure.

The method for preparing the organoboron compounds as described herein will now be disclosed. The method may comprise the steps of: (a) providing a first precursor having a structure of Formula (IV):

Formula (IV)

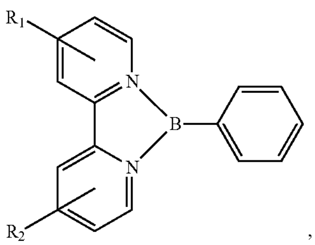

, with $R_1$ and $R_2$ each being the mono-, di- or tri-substitution as defined herein; and (b) converting the first precursor into the organoboron compound.

In some particular embodiments, the first precursor may have a structure of Formula (IVA):

Formula (IVA)

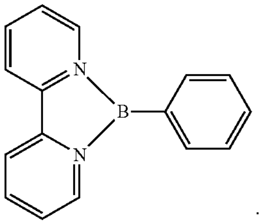

.

In these particular embodiments, the method may comprise the step of converting the first precursor having the structure of Formula (IVA) into the organoboron compound at room temperature such as from about 20° C. to 40° C.

In some embodiments, the converting step may include stirring a first reaction mixture comprising the first precursor having the structure of Formula (IVA), phenyllithium and-THE toluene at room temperature for at least 8 hours to form the organoboron compound having the structure of Formula (II). In particular, the first precursor having the structure of Formula (IVA) and phenyllithium may have a molar ratio of about 1:1.5, such as 1:1.48 . . . 1:1.482 . . . 1:1.486 . . . 1:1.49 . . . 1:1.494 . . . 1:1.5 . . . 1:1.505 . . . 1:1.51 and the like.

In some embodiments, the converting step may include stirring a second reaction mixture comprising the first precursor having the structure of Formula (IVA), phenyllithium and THF at room temperature for at least 8 hours to form the organoboron compound having the structure of Formula (IIIA). In particular, the first precursor having the structure of Formula (IVA) and phenyllithium may have a molar ratio of about 1:1, such as 1:0.9 . . . 1:0.94 . . . 1:0.96 . . . 1:0.99 . . . 1:1 . . . 1:1.01 . . . 1:1.05 . . . 1:1.1 and the like. In some particular embodiments, the organoboron compound having the structure of Formula (IIIA) may be further converted to the organoboron compound having the structure of Formula (II). This converting step may include stirring a third reaction mixture comprising the organoboron compound having the structure of Formula (IIIA) and toluene at room temperature for at least 8 hours to form the organoboron compound having the structure of Formula (II).

In some embodiments, the converting step may include stirring a fourth reaction mixture comprising the organoboron compound having the structure of Formula (II), potassium and THF at room temperature for at least 8 hours to form the organoboron compound having the structure of Formula (IIIB). In particular, the organoboron compound having the structure of Formula (II) and potassium may have a molar ratio of about 1:2, such as about 1:1.9 . . . 1:1.94 . . . 1:1.96 . . . 1:1.99 . . . 1:2 . . . 1:2.01 . . . 1:2.05 . . . 1:2.1 and the like.

Without wishing to be bound by theory, it is believed that the organoboron compound having the structure of Formula (IIIB) is reversibly convertible to the organoboron compound having the structure of Formula (II). For example, in some embodiments, the organoboron compound having the structure of Formula (IIIB) may be reversibly converted to the organoboron compound having the structure of Formula (II) when the organoboron compound having the structure of Formula (IIIB) is heated in toluene at a temperature of about 70° C. to about 80° C., such as from 68° C. to 82° C., from 68° C. to 81° C., from 69° C. to 82° C., from 70° C. to 82° C., from 71° C. to 80° C., from 70° C. to 78° C., from 72° C. to 82° C., from 72° C. to 76° C., from 73° C. to 76° C. and the like, for at least 8 hours.

Hereinafter, the present invention is described more specifically by way of examples, but the present invention is not limited thereto.

EXAMPLES

Materials and Characterization

Materials

All synthetic experiments and product purifications were conducted using glovebox (Ar) or Schlenk ($N_2$) techniques (except for preparative thin layer chromatography, PTLC, and column chromatography). Chemicals were purchased from Sigma Aldrich, TCI, Aladdin, Macklin, or Bidepharm and used without further treatment. SPS-purified THF, toluene, and n-hexane were dried using 3 Å molecular sieves in the glovebox. Deuterated solvents ($CDCl_3$, $C_6D_6$) were degassed by freeze-pump-thaw cycles and stored over 3 Å molecular sieves in the glovebox (THF-$d_8$ was dried using NaK before use, and deuterated solvents for air-stable products were used without further treatment). $CO_2$ (99.99%) was purchased from Linde Industrial Gases and dried with a combination of a $P_2O_5$ drying column and 3 Å molecular sieves over one week.

The nuclear magnetic resonance (NMR) spectroscopy was facilitated over a Bruker Avance series of spectrometers with frequencies of 300, 400, and 600 MHz. Chemical shifts (δ) are presented in ppm and set relative to the respective solvent's residual proton ($^1H$) signal or the carbon nuclei ($^{13}C\{^1H\}$).[11] $^{11}B$, $^{119}Sn\{^1H\}$, $^{31}P\{^1H\}$NMR spectra were referenced to external standards, $BF_3{\cdot}OEt_2$, $SnMe_4$ and 85% $H_3PO_4$, respectively. High-resolution mass spectra were recorded via a Sciex X500R Q-TOF mass spectrometer.

Gas products were analyzed by online gas chromatography (GC2060).

Cyclic voltammetry (CV) was tested using CH instruments CHI660 electrochemical workstation. All experiments were carried out under an atmosphere of argon in the three-electrode cell (glassy carbon used as working electrode, platinum wire electrode used as counter electrode, and silver electrode used as reference electrode) with anhydrous THF solution containing 0.1 M [nBu4N][PF6](dried over 3 Å molecular sieves for one week before test). Ferrocene/ferrocenium couple was used as an internal standard.

EPR spectra were acquired on ADANI SPINSCAN X EPR Spectrometer. All samples were prepared and tested under argon conditions. Easyspin (5.2.35) was used to simulate the spectra. Microwave frequency was 9.450400 GHz, and power was 14.581 mW.

Powder XRD Analysis was acquired on Bruker D2 Phaser. The sample was prepared as follows: during the synthesis of [(bipy)$BPh_2$](6), the insoluble black solids were collected and washed with THF (6 mL) and dried under a fine vacuum as grey powder. Samples were stored in argon and quickly tested in air.

XPS Analysis was acquired on Thermo Scientific K-Alpha. Sample Exp. was prepared as follows: during the synthesis of [(bipy)$BPh_2$](6), the insoluble black solids were collected and washed with THF (6 mL) and dried under a fine vacuum as grey powder. Sample Cml. was from Sigma-Aldrich 499811-100G, Lithium granular, 99% trace metals basis. Sample Exp.+Cml. was a mixture of Sample Exp. and Sample Cml.

Inductively Coupled Plasma Optical Emission spectroscopy (ICP-OES) was recorded using The OPtima 8000 spectrometer. Detection of $Li^+$ is performed as follows: the sample was collected from the reaction as detailed in Example 4B. The insoluble black solids were collected, washed with THF (6 mL), and dried under a fine vacuum as grey powder. Compound 5 (1.5 mg) was quenched with deionized water (1 mL). Detection of $K^+$ is performed as follows: the sample was collected form the reaction as detailed in Example 4C. Compound (5') (35 mg, 0.070 mmol) was suspended in toluene (10 mL) at room temperature. The mixture was heated with or without stirring at 75° C. overnight. The color of the toluene solution turned dark green. After filtration, the toluene solution was collected, and all the volatile was removed under a high vacuum, affording compound 6 (2.3 mg, 10%). The residue was then washed with THF (6 mL). The residue and funnel were quenched with 1 mL of deionized water and washed with 9 mL of deionized water. (collected 10 mL in total).

All the computational calculations were carried out using ORCA (version 5.0.4). Geometry optimization was performed at the density functional theory (DFT) using M062X with a def2-TZVP basis set. Counterions were omitted during calculations. The THF solution was modeled by the Conductor-like Polarizable Continuum Model (CPCM) in optimization. Harmonic vibrational analyses were carried out to confirm if the optimized structure was a local minimum structure and to provide zero-point vibrational energy corrections and thermal corrections to various thermodynamic properties. Magnetic properties were calculated using revTPSS [13]/pcSseg-1 level of theory with optimized structures with the SMD solvent model. ACID was calculated from AICD2.0 software.

Naphthalene anion was used as a reducing agent in the control experiments of the P—P, Sn—Sn, Se—Se, and Ge—Ge coupling reactions, and of the reductive coupling of pyridine and Birch reduction of Acridine. In these control experiments, sodium naphthalene was freshly prepared from a mixture of naphthalene and sodium in THF at −35° C. (concentration was 0.1 mol/L).

For control experiment of P—P coupling reactions, to the $C_6D_6$ solution of $Ph_2PCl$ (4.4 mg, 0.02 mmol, 1.0 eq.) in J. Young's tube was added 200 μL 0.1M sodium naphthalene (0.02 mmol, 1.0 eq.). The reaction was placed at room temperature overnight, and subjected to $^{31}P$ NMR analysis afterwards.

For control experiment of Sn—Sn coupling reactions, to the $C_6D_6$ solution of nBu3SnC1 (6.5 mg, 0.02 mmol, 1.0 eq.) in J. Young's tube was added 200 μL 0.1M sodium naphthalene (0.02 mmol, 1.0 eq.). The reaction was placed at room temperature overnight, and subjected to $^1H$ NMR analysis afterwards.

For control experiment of Se—Se coupling reactions, to the $C_6D_6$ solution of PhSeCl (3.8 mg, 0.02 mmol, 1.0 eq.) in J. Young's tube was added 200 μL 0.1M sodium naphthalene (0.02 mmol, 1.0 eq.). The reaction was placed at room temperature overnight, and subjected to $^1H$ NMR analysis afterwards.

For control experiment of Ge—Ge coupling reactions, to the $C_6D_6$ solution of $Et_3GeCl$ (3.9 mg, 0.02 mmol, 1.0 eq.) in J. Young's tube was added 200 μL 0.1M sodium naphthalene (0.02 mmol, 1.0 eq.). The reaction was placed at room temperature overnight, and subjected to $^1H$ NMR analysis afterwards.

For control experiment of reductive pyridine coupling, to 0.1M Sodium naphthalene (0.63 mmol, 1.0 eq.), pyridine (50 mg, 0.63 mmol, 1.0 eq.) was added. After stirring at room temperature overnight, drops of MeOH were added to quench the reaction. The reaction mixture was then subjected to TLC analysis (EA:DCM=2:1, 1% $NEt_3$).

For control experiment of reduction of acridine, to 0.1M sodium naphthalene (0.28 mmol, 1.0 eq.), acridine (50 mg, 0.28 mmol, 1.0 eq.) was added. After stirring at room temperature overnight, drops of MeOH were added to quench the reaction. The reaction mixture was then subjected to TLC analysis (EA:Hex=1:5).

Example 1

Synthesis of (bipy)BPh (4) (Formula (IVA))

Figure 2:
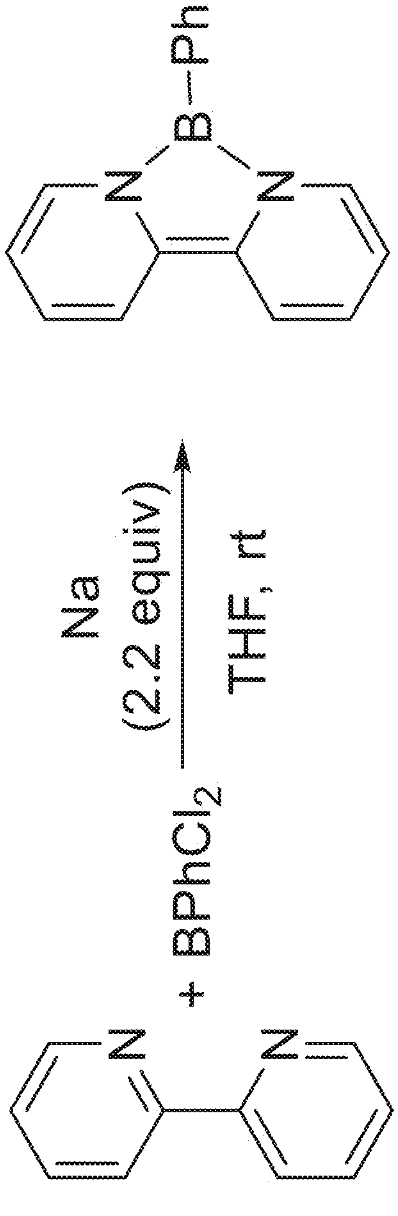
FIG. 2 is a synthetic scheme illustrating the synthesis of (bipy)BPh (4)

The synthetic scheme of (bipy)BPh (4) is illustrated in FIG. 2. Specifically, to a solution of 2,2'-bipyridine (1075 mg, 6.89 mmol, 1.0 eq.) in THF (20 mL) was added $BPhCl_2$ (1096 mg, 6.89 mmol, 1.0 eq.). The mixture was stirred at room temperature for 5 min. Then, sodium (348 mg, 15.13 mmol, 2.2 eq.) was added to the reaction mixture at room temperature, and the reaction was stirred at room temperature overnight. Afterward, all the volatile was removed under a high vacuum, and toluene (50 mL) was added to extract the target product. After filtration, the toluene phase was reduced under high vacuum, affording compound 4 as a red solid (1132 mg, 67%). Compound 4 was pure at this stage, and no further purification was needed.

$^{1}$H NMR (400 MHz, $C_6D_6$, 298K): δ [ppm]=7.64 (d, $J_{H-H}$=7.2 Hz, 2H), 7.49 (d, $J_{H-H}$=6.1 Hz, 2H), 7.31-7.23 (m, 3H), 7.19 (d, $J_{H-H}$=9.1 Hz, 2H), 6.18 (dd, $J_{H-H}$=9.3, 6.0 Hz, 2H), 5.92 (t, $J_{H-H}$=6.6 Hz, 2H). $^{11}$B NMR (128 MHz, $C_6D_6$, 298K): δ [ppm]=21.56. $^{13}$C{$^{1}$H}NMR (100 MHz, $C_6D_6$, 298K): δ [ppm]=133.84, 129.33, 128.71, 127.25, 118.99, 118.55, 114.77, 110.93. HRMS (m/z): Calc. For [4] ($C_{16}H_{13}BN_2$): 244.1172 Found: 244.1169.

Example 2

Synthesis of $[Li(THF)_4][(bipy)BPh_2]$(5) (Formula (IIIA))

Figure 3:
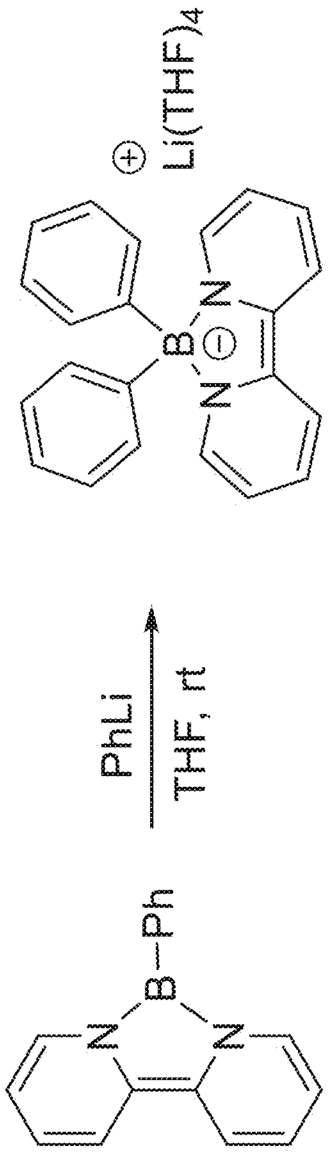
FIG. 3 is a synthetic scheme illustrating the synthesis of $[Li(THF)_4][(bipy)BPh_2]$(5) from (bipy)BPh (4)

The synthetic scheme of $[Li(THF)_4][(bipy)BPh_2]$ is illustrated in FIG. 3. Specifically, to a solution of compound 4 (300 mg, 1.23 mmol, 1.0 eq.) in THF (10 mL) was added PhLi (103 mg, 1.23 mmol, 1.0 eq.) at room temperature. The reaction mixture was stirred at room temperature overnight. Afterward, the mixture was filtered. The filtrate was collected and reduced under a high vacuum, affording 5 as a black solid (540 mg, 71%).

Single crystals suitable for X-ray crystal structure analysis were obtained from vapor diffusion of n-hexane to THF solution at room temperature.

$^{1}$H NMR (400 MHz, THF-$d_8$, 298K): δ [ppm]=7.42 (d, $J_{H-H}$=7.3 Hz, 4H), 7.03 (t, $J_{H-H}$=7.3 Hz, 4H), 6.88 (t, $J_{H-H}$=7.3 Hz, 2H), 5.68 (d, $J_{H-H}$=6.7 Hz, 2H), 5.11 (d, $J_{H-H}$=9.4 Hz, 2H), 4.64 (dd, $J_{H-H}$=9.5, 5.3 Hz, 2H), 3.82 (t, $J_{H-H}$=6.1 Hz, 2H).

$^{11}$B NMR (128 MHz, THF-$d_8$, 298K): δ [ppm]=2.79. $^{13}$C{$^{1}$H}NMR (100 MHz, THF-$d_8$, 298K): δ [ppm]=140.43, 133.96, 126.66, 124.27, 119.68, 117.64, 116.24, 94.50. HRMS (m/z): Calc. For [5-Li$(THF)_4$]($C_{22}H_{18}BN_2$): 321.1563 Found: 321.1548

Example 3

Synthesis of $[K(THF)_2][(bipy)BPh_2]$(5') (Formula (IIIB))

Figure 4:
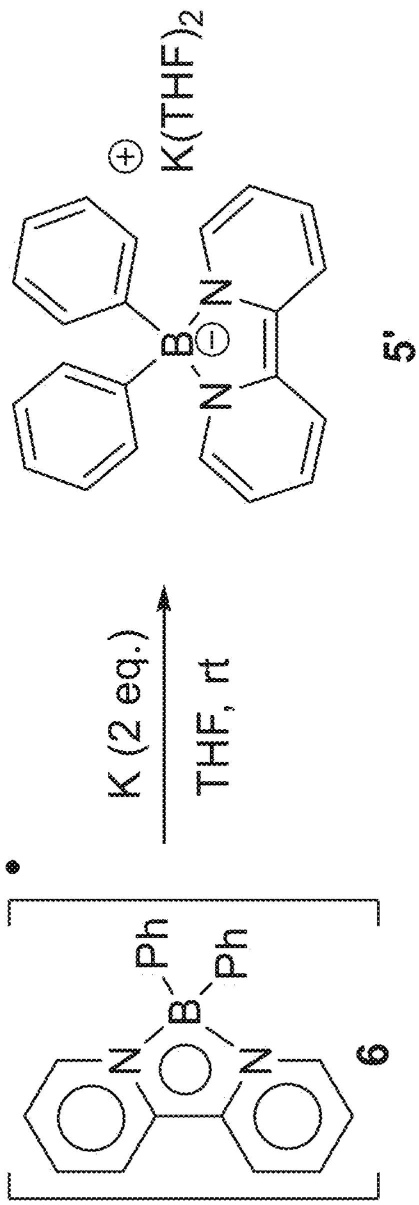
FIG. 4 is a synthetic scheme illustrating the synthesis of $[K(THF)_2][(bipy)BPh_2]$(5') from $[(bipy)BPh_2]$(6)

The synthetic scheme of $[K(THF)_2][(bipy)BPh_2]$(5') illustrated in FIG. 4. Specifically, to a solution of compound 6 ($[(bipy)BPh_2]$) (367 mg, 1.14 mmol, 1.0 eq.) in THF (10 mL) was added potassium (89 mg, 2.28 mmol, 2.0 eq.) at room temperature. The reaction mixture was stirred at room temperature overnight. Afterward, the mixture was filtered. The filtrate was collected and reduced under a high vacuum, affording compound 5' as a black solid (552 mg, 96%).

$^{1}$H NMR (400 MHz, THF-$d_8$, 298K): δ [ppm]=7.42 (d, $J_{H-H}$=7.2 Hz, 4H), 7.09 (t, $J_{H-H}$=7.3 Hz, 4H), 6.95 (t, $J_{H-H}$=7.3 Hz, 2H), 5.70 (d, $J_{H-H}$=6.8 Hz, 2H), 5.20 (d, $J_{H-H}$=9.5 Hz, 2H), 4.73 (dd, $J_{H-H}$=9.5, 5.3 Hz, 2H), 3.93 (t, $J_{H-H}$=6.1 Hz, 2H). $^{11}$B NMR (128 MHz, THF-$d_8$, 298K): δ [ppm]=2.73. $^{13}$C{$^{1}$H}NMR (100 MHz, THF-$d_8$, 298K): δ [ppm]=139.66, 133.32, 126.97, 124.75, 118.84, 117.29, 116.54, 95.25. HRMS (m/z): Calc. For [5'-K$(THF)_2$] ($C_{22}H_{18}BN_2$): 321.1563 Found: 321.1555.

Example 4A

Synthesis of $[(bipy)BPh_2]$(6) from (bipy)BPh (4)

Figure 5A:
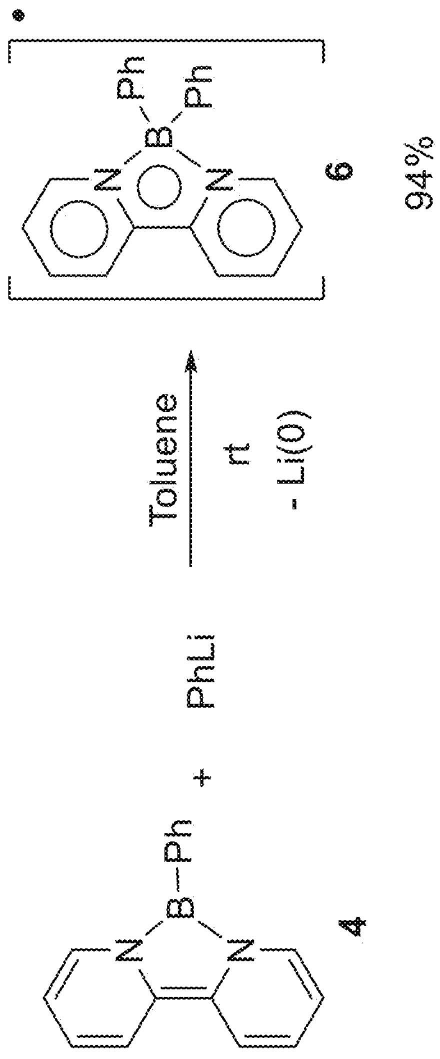
FIG. 5A is a synthetic scheme illustrating the synthesis of $[(bipy)BPh_2]$(6) from (bipy)BPh (4)

The synthetic scheme is illustrated in FIG. 5A. Specifically, to a solution of 4 (210 mg, 0.86 mmol, 1.0 eq.) in toluene (10 mL) was added PhLi (108 mg, 1.29 mmol, 1.5 eq.) at room temperature. The reaction mixture was stirred at room temperature overnight. Afterward, the mixture was filtered. The filtrate was collected and reduced under a high vacuum, affording compound 6 as a deep green solid (260 mg, 94%).

Single crystals suitable for X-ray crystal structure analysis were obtained from the slow evaporation of a toluene solution at room temperature or recrystallization at −35° C. in THF. $^{1}$H NMR (400 MHz, $C_6D_6$, 298K): silence. $^{11}$B NMR (128 MHz, $C_6D_6$, 298K): silence. g-factor (toluene, 298K): 2.0036. HRMS (m/z): Calc. For 6 ($C_{22}H_{18}BN_2$): 321.1563 Found: 321.1552.

Example 4B

Synthesis of $[(bipy)BPh_2]$(6) from $[Li(THF)_4]$ $[(bipy)BPh_2]$(5)

Figure 5B:
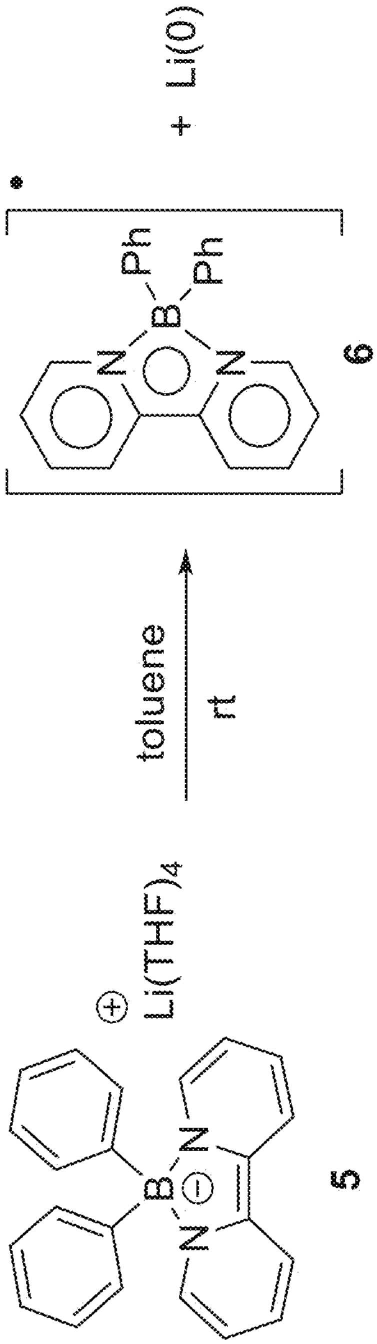
FIG. 5B is a synthetic scheme illustrating the synthesis of $[(bipy)BPh_2]$(6) from $[Li(THF)_4][(bipy)BPh_2]$(5)

The synthetic scheme is illustrated in FIG. 5B. Specifically, toluene (10 mL) was added to 5 (255 mg, 0.41 mmol) in the glovebox and stirred at room temperature overnight. Afterward, the mixture was filtered. The filtrate was collected and reduced under a high vacuum, affording compound 6 as deep green powder. (113 mg, 85%)

Single crystals suitable for X-ray crystal structure analysis were obtained from the slow evaporation of a toluene solution at room temperature or recrystallization at −35° C. in THF. $^{1}$H NMR (400 MHz, $C_6D_6$, 298K): silence. $^{11}$B NMR (128 MHz, $C_6D_6$, 298K): silence. g-factor (toluene, 298K): 2.0036. HRMS (m/z): Calc. For [6]($C_{22}H_{18}BN_2$): 321.1563 Found: 321.1552.

Example 4C

Synthesis of $[(bipy)BPh_2]$(6) from $[K(THF)_2]$ $[(bipy)BPh_2]$(5')

Figure 5C:
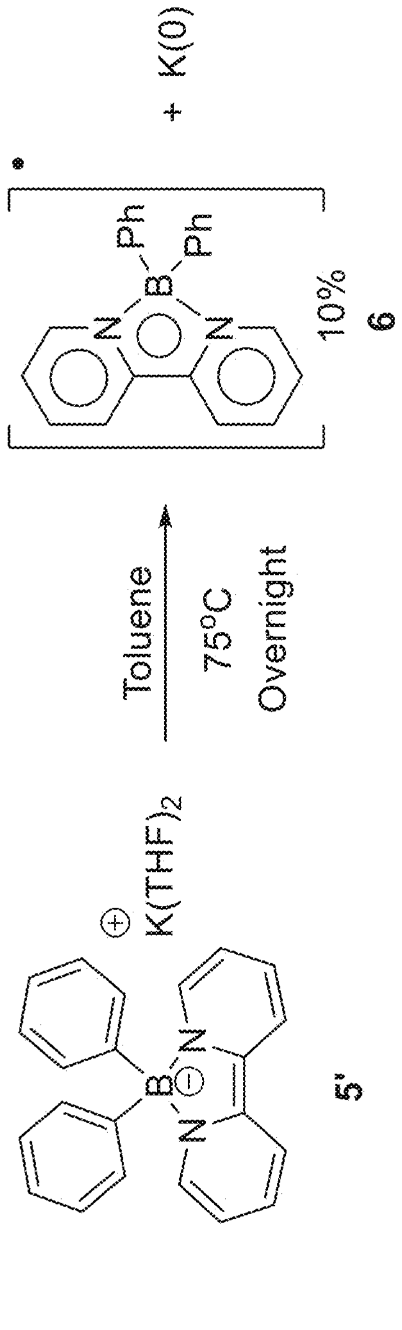
FIG. 5C is a synthetic scheme illustrating the synthesis of $[(bipy)BPh_2]$(6) from $[K(THF)_2][(bipy)BPh_2]$(5')

The synthetic scheme is illustrated in FIG. 5C. Specifically, compound 5' (35 mg, 0.070 mmol) was suspended in toluene (10 mL) at room temperature. The mixture was heated with or without stirring at 75° C. overnight. The color of the toluene solution turned dark green. After filtration, the toluene solution was collected, and all the volatile was removed under a high vacuum, affording compound 6 (2.3 mg, 10%).

Single crystals suitable for X-ray crystal structure analysis were obtained from the slow evaporation of a toluene solution at room temperature or recrystallization at −35° C. in THF. $^{1}H$ NMR (400 MHz, $C_6D_6$, 298K): silence. $^{11}B$ NMR (128 MHz, $C_6D_6$, 298K): silence. g-factor (toluene, 298K): 2.0036. HRMS (m/z): Calc. For 6 ($C_{22}H_{18}BN_2$): 321.1563 Found: 321.1552.

Example 5

Figure 6:
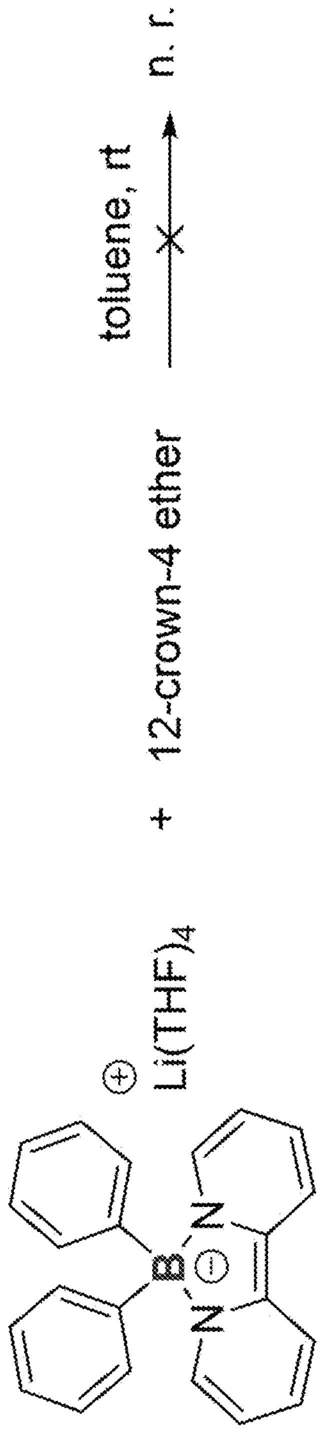
FIG. 6 is a schematic diagram illustrating the reaction of $[Li(THF)_4][(bipy)BPh_2]$(5) nad 12-crown-4-ether in toluene.
Figure 7:
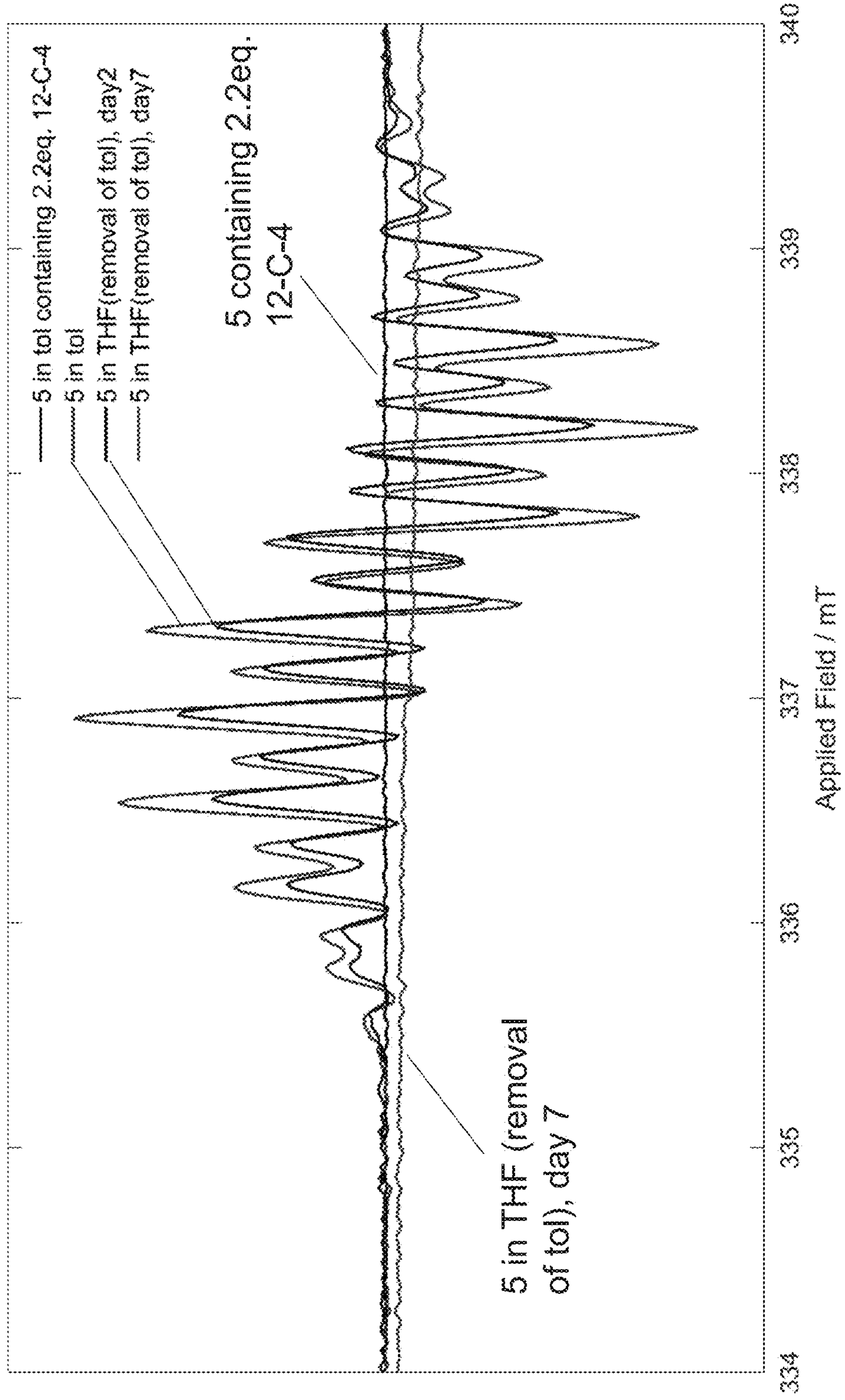
FIG. 7 shows the EPR spectra of $[Li(THF)_4][(bipy)BPh_2]$ (5) under various reaction conditions.

Control Experiment 12-crown-4 ether (6 mg, 0.035 mmol, 2.2 eq.) was solved in toluene (1 mL) and added to compound 5 (10 mg, 0.016 mmol) in a J. Young's tube (FIG. 6). The solution was slightly red, and many black powders remained insoluble. The solution was EPR silence. (FIG. 7)

Example 6A

Synthesis of [(bipy)$BPh_2$][$CuCl_2$](7) from [K(THF)$_2$][(bipy)$BPh_2$](5')

Figure 8A:
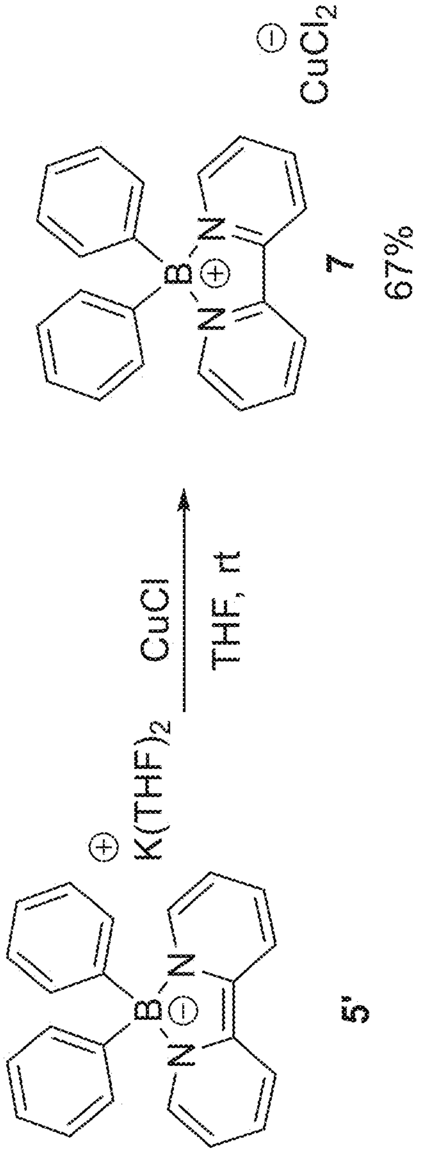
FIG. 8A is a synthetic scheme illustrating the synthesis of $[(bipy)BPh_2][CuCl_2]$(7) from $[K(THF)_2][(bipy)BPh_2]$(5')

The synthetic scheme is illustrated in FIG. 8A. Specifically, To THF solution (10 mL) of 5' (297 mg, 0.59 mmol, 1.0 eq.) was added CuCl (175 mg, 1.77 mmol, 3.0 eq.). The reaction mixture was stirred at room temperature overnight. Afterward, the solution was concentrated to about 2 mL, and n-hexane (5 mL) was added. Red solids precipitated after storage at −35° C. overnight. After filtration, the solids were dried over high vacuum, affording compound 7 (180 mg, 67%).

Single crystals suitable for X-ray crystal structure analysis were obtained from recrystallization at −35° C. in the mixture solvent of DCM/n-hexane/THF. $^{1}H$ NMR (600 MHz, $CDCl_3$, 298K): δ [ppm]=9.51 (d, $J_{H-H}$=8.1 Hz, 2H), 8.79 (t, $J_{H-H}$=8.0 Hz, 2H), 8.64 (d, $J_{H-H}$=5.7 Hz, 2H), 8.02 (t, $J_{H-H}$=6.8 Hz, 2H), 7.38-7.31 (m, 6H), 7.13 (d, $J_{H-H}$=7.0 Hz, 4H). $^{11}B$ NMR (128 MHz, $CDCl_3$, 298K): δ [ppm]=9.75. $^{13}C\{^{1}H\}$NMR (150 MHz, $CDCl_3$, 298K): δ [ppm]=145.68, 143.40, 132.69, 129.33, 129.10, 128.91, 125.24. HRMS (m/z): Calc. For [7-$CuCl_2$]($C_{22}H_{18}BN_2$): 321.1563 Found: 321.1557.

Example 6B

Synthesis of [(bipy)$BPh_2$][$CuCl_2$](7) from [(bipy)$BPh_2$](6)

Figure 8B:
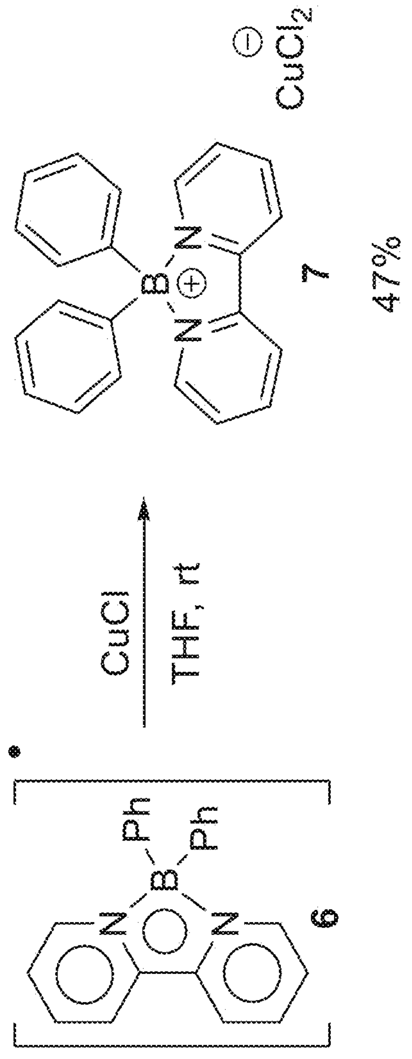
FIG. 8B is a synthetic scheme illustrating the synthesis of $[(bipy)BPh_2][CuCl_2]$(7) from $[(bipy)BPh_2]$(6)

The synthetic scheme is illustrated in FIG. 8B. Specifically, to THF solution (4 mL) of 6 (50 mg, 0.15 mmol, 1.0 eq.) was added CuCl (154 mg, 1.55 mmol, 10 eq.). The reaction was stirred at room temperature overnight. Then, excess CuCl was removed via filtration. All the volatile was removed under a fine vacuum, and 7 was obtained as a red powder (33 mg, 47%).

Single crystals suitable for X-ray crystal structure analysis were obtained from recrystallization at −35° C. in the mixture solvent of DCM/n-hexane/THF. $^{1}H$ NMR (600 MHz, $CDCl_3$, 298K): δ [ppm]=9.51 (d, $J_{H-H}$=8.1 Hz, 2H), 8.79 (t, $J_{H-H}$=8.0 Hz, 2H), 8.64 (d, $J_{H-H}$=5.7 Hz, 2H), 8.02 (t, $J_{H-H}$=6.8 Hz, 2H), 7.38-7.31 (m, 6H), 7.13 (d, $J_{H-H}$=7.0 Hz, 4H). $^{11}B$ NMR (128 MHz, $CDCl_3$, 298K): δ [ppm]=9.75. $^{13}C\{^{1}H\}$NMR (150 MHz, $CDCl_3$, 298K): δ [ppm]=145.68, 143.40, 132.69, 129.33, 129.10, 128.91, 125.24. HRMS (m/z): Calc. For [7-$CuCl_2$]($C_{22}H_{18}BN_2$): 321.1563 Found: 321.1557.

Example 7A

P—P Coupling Reaction from [K(THF)$_2$][(bipy)$BPh_2$](5')

Figure 9A:
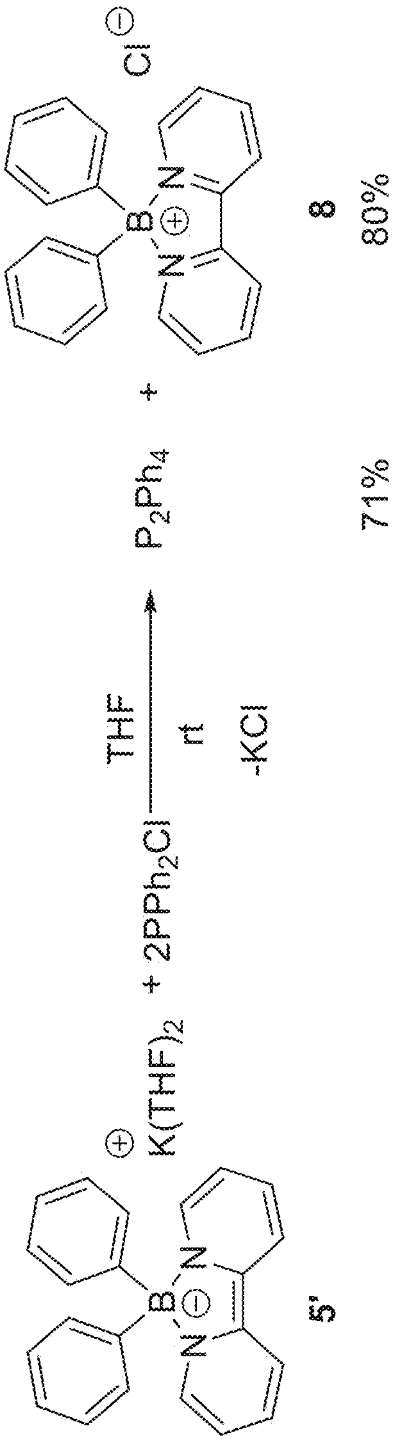
FIG. 9A is a schematic diagram illustrating the P—P coupling reaction assisted by $[K(THF)_2][(bipy)BPh_2]$(5')

The reaction scheme is illustrated in FIG. 9A. Specifically, to the THF solution (5 mL) of 5' (100 mg, 0.20 mmol, 1.0 eq.) was added $PPh_2Cl$ (90 mg, 0.40 mmol, 2.0 eq.). The reaction was stirred at room temperature overnight, and all the volatile was removed under a high vacuum afterward. The residue was extracted by n-hexane (2×6 mL). $P_2Ph_4$ was in the hexane solution and obtained after being dried under a high vacuum, giving a yellow powder (54 mg, 71%). The residue was dried under high vacuum as 8 (59 mg, 80%).

$P_2Ph_4$: $^{1}H$ NMR (400 MHz, $C_6D_6$, 298K): δ [ppm]=7.58-7.52 (m, 4H), 6.97-6.91 (m, 6H). $^{31}P\{^{1}H\}$NMR (161 MHz, $C_6D_6$, 298K): δ [ppm]=−15.01. [8]: $^{1}H$ NMR (400 MHz, $CDCl_3$, 298K): δ [ppm]=10.72 (d, $J_{H-H}$=8.3 Hz, 2H), 8.71 (t, $J_{H-H}$=8.1 Hz, 2H), 8.57 (d, $J_{H-H}$=5.6 Hz, 2H), 7.95 (t, $J_{H-H}$=6.8 Hz, 2H), 7.40-7.29 (m, 6H), 7.08 (d, $J_{H-H}$=7.0 Hz, 4H). $^{11}B$ NMR (128 MHz, $CDCl_3$, 298K): δ [ppm]=9.16 $^{13}C\{^{1}H\}$NMR (100 MHz, $CDCl_3$, 298K): δ [ppm]=145.70, 142.63, 132.55, 129.10, 128.94, 128.64, 127.30.

Example 7B

P—P Coupling Reaction from [(bipy)$BPh_2$](6)

Figure 9B:
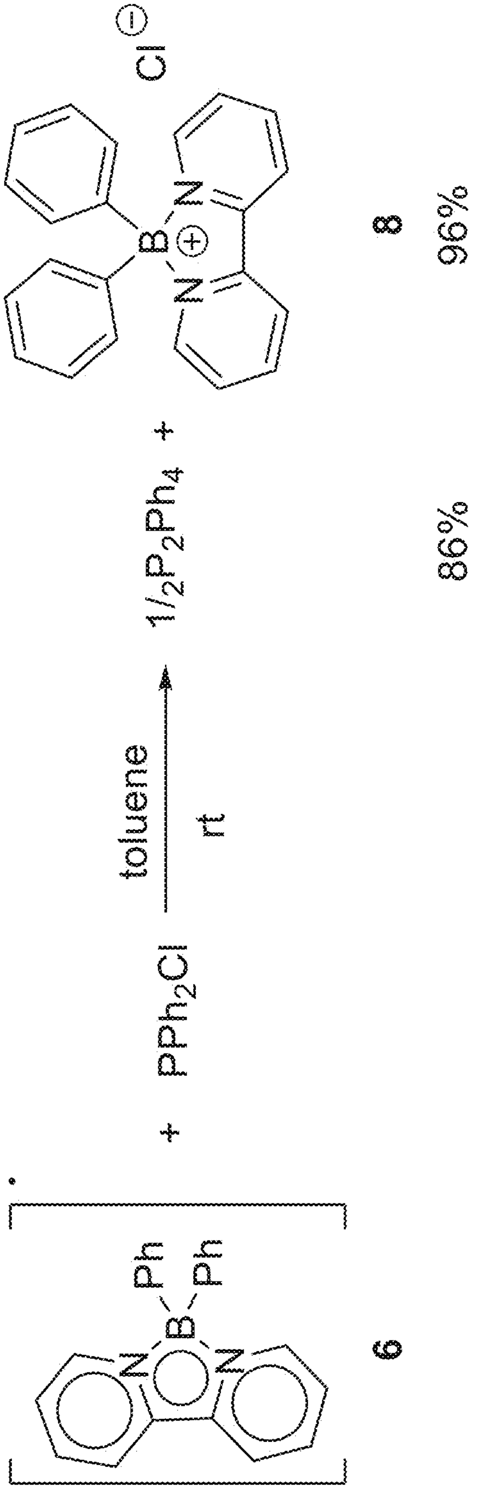
FIG. 9B is a schematic diagram illustrating the P—P coupling reaction assisted by $[(bipy)BPh_2]$(6)

The reaction scheme is illustrated in FIG. 9B. Specifically, to the toluene solution (5 mL) of 6 (50 mg, 0.16 mmol, 1.0 eq.) was added $PPh_2Cl$ (35 mg, 0.16 mmol, 1.0 eq.). The reaction was stirred at room temperature overnight. All the volatile was removed under a high vacuum afterward. The residue was extracted by n-hexane (3×3 mL). $P_2Ph_4$ was in the hexane solution and obtained after being dried under a high vacuum, giving a yellow powder (25 mg, 86%). The residue was dried under high vacuum as 8 (55 mg, 96%).

$P_2Ph_4$: $^{1}H$ NMR (400 MHz, $C_6D_6$, 298K): δ [ppm]=7.58-7.52 (m, 4H), 6.97-6.91 (m, 6H). $^{31}P\{^{1}H\}$NMR (161 MHz, $C_6D_6$, 298K): δ [ppm]=−15.01. 8: $^{1}H$ NMR (400 MHz, $CDCl_3$, 298K): δ [ppm]=10.72 (d, $J_{H-H}$=8.3 Hz, 2H), 8.71 (t, $J_{H-H}$=8.1 Hz, 2H), 8.57 (d, $J_{H-H}$=5.6 Hz, 2H), 7.95 (t, $J_{H-H}$=6.8 Hz, 2H), 7.40-7.29 (m, 6H), 7.08 (d, $J_{H-H}$=7.0 Hz, 4H). $^{11}B$ NMR (128 MHz, $CDCl_3$, 298K): δ [ppm]=9.16 $^{13}C\{^{1}H\}$NMR (100 MHz, $CDCl_3$, 298K): δ [ppm]=145.70, 142.63, 132.55, 129.10, 128.94, 128.64, 127.30.

Example 8

Sn—Sn Coupling Reaction

Figure 10:
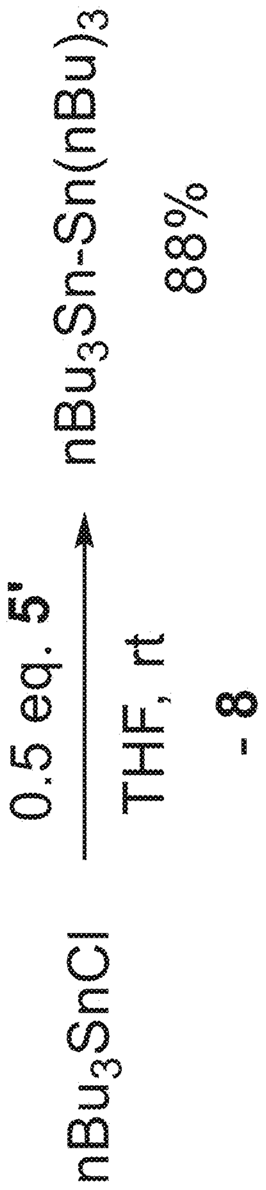
FIG. 10 is a schematic diagram illustrating the Sn—Sn coupling reaction assisted by $[K(THF)_2][(bipy)BPh_2](5')$.

The reaction scheme is illustrated in FIG. 10. Specifically, to the THF solution (3 mL) of 5' (50 mg, 0.10 mmol, 1 eq.) was added $nBu_3SnC1$ (64 mg, 0.20 mmol, 2.0 eq.). The reaction was stirred at room temperature overnight, and all the volatile was removed under a high vacuum afterward. The residue was extracted by n-hexane, and n-$Bu_6Sn_2$ was obtained after removing all the volatiles under a high vacuum (50 mg, 88%).

$NBu_6Sn_2$: $^{1}H$ NMR (400 MHz, $C_6D_6$, 298K): δ [ppm]=1.80-1.58 (m, 12H), 1.47-1.36 (m, 12H), 1.26-1.07 (m, 12H), 0.98 (t, $J_{H-H}$=7.3 Hz, 18H). $^{13}C\{^{1}H\}$NMR (100

MHz, $C_6D_6$, 298K): δ [ppm]=29.87, 27.74, 13.78, 10.23. $^{119}Sn\{^1H\}$NMR (149 MHz, $C_6D_6$, 298K): δ [ppm]=−83.72.

Example 9

Se—Se Coupling Reaction

Figure 11:
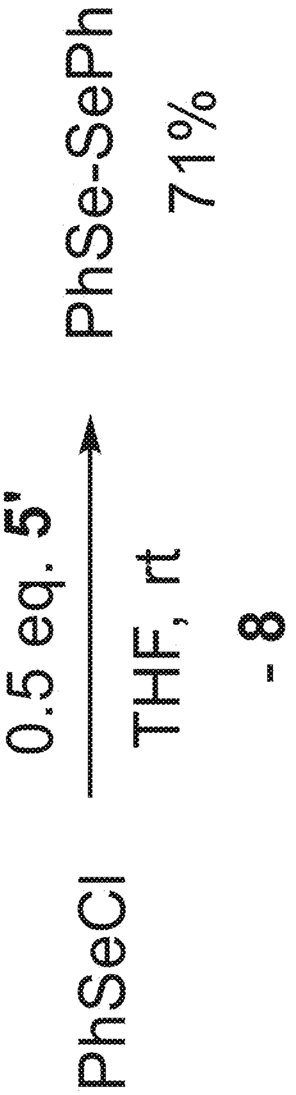
FIG. 11 is a schematic diagram illustrating the Se—Se coupling reaction assisted by $[K(THF)_2][(bipy)BPh_2](5')$.

The reaction scheme is illustrated in FIG. 11. Specifically, PhSeCl (38 mg, 0.20 mmol, 2.0 eq.) was added to the THF solution (3 mL) of 5' (50 mg, 0.10 mmol, 1.0 eq.). The reaction was stirred at room temperature overnight, and all the volatile was removed under a high vacuum afterward. $Ph_2Se_2$ was successfully isolated using PTLC (n-hexane) and obtained as a yellow powder (22 mg, 71%).

$Ph_2Se_2$: $^1H$ NMR (400 MHz, $CDCl_3$, 298K): δ [ppm]=7.66-7.57 (m, 4H), 7.34-7.21 (m, 6H).

Example 10

Ge—Ge Coupling Reaction

Figure 12:
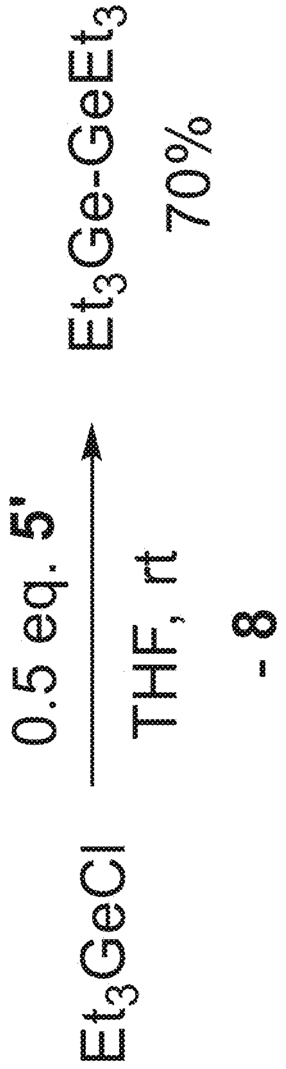
FIG. 12 is a schematic diagram illustrating the Ge—Ge coupling reaction assisted by $[K(THF)_2][(bipy)BPh_2](5')$.

The reaction scheme is illustrated in FIG. 12. Specifically, a THF solution (1 mL) of $Et_3GeCl$ (38 mg, 0.20 mmol, 2.0 eq.) was added to 5' (50 mg, 0.10 mmol, 1.0 eq.) in THF (3 mL). The reaction was stirred at room temperature overnight, and all the volatile was removed under a high vacuum afterward. $Et_6Ge_2$ was purified through column chromatography using n-hexane as an eluent and obtained as a colorless oil (11 mg, 70%).

$Et_6Ge_2$: $^1H$ NMR (400 MHz, $CDCl_3$, 298K): δ [ppm]=1.05 (t, $J_{H-H}$=7.7 Hz, 18H), 0.86 (q, $J_{H-H}$=7.6 Hz, 12H). $^{13}C\{^1H\}$NMR (100 MHz, $CDCl_3$, 298K): δ [ppm]=10.08, 5.44.

Example 11

H—H Coupling Reaction

Figure 13:
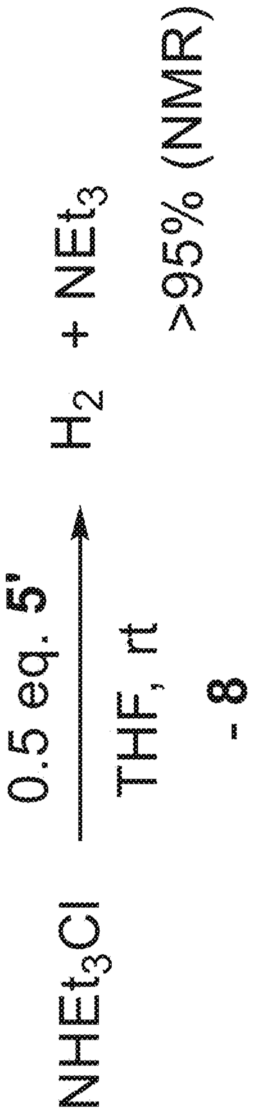
FIG. 13 is a schematic diagram illustrating the formation of $H_2$ assisted by $[K(THF)_2][(bipy)BPh_2](5')$.
Figure 14:
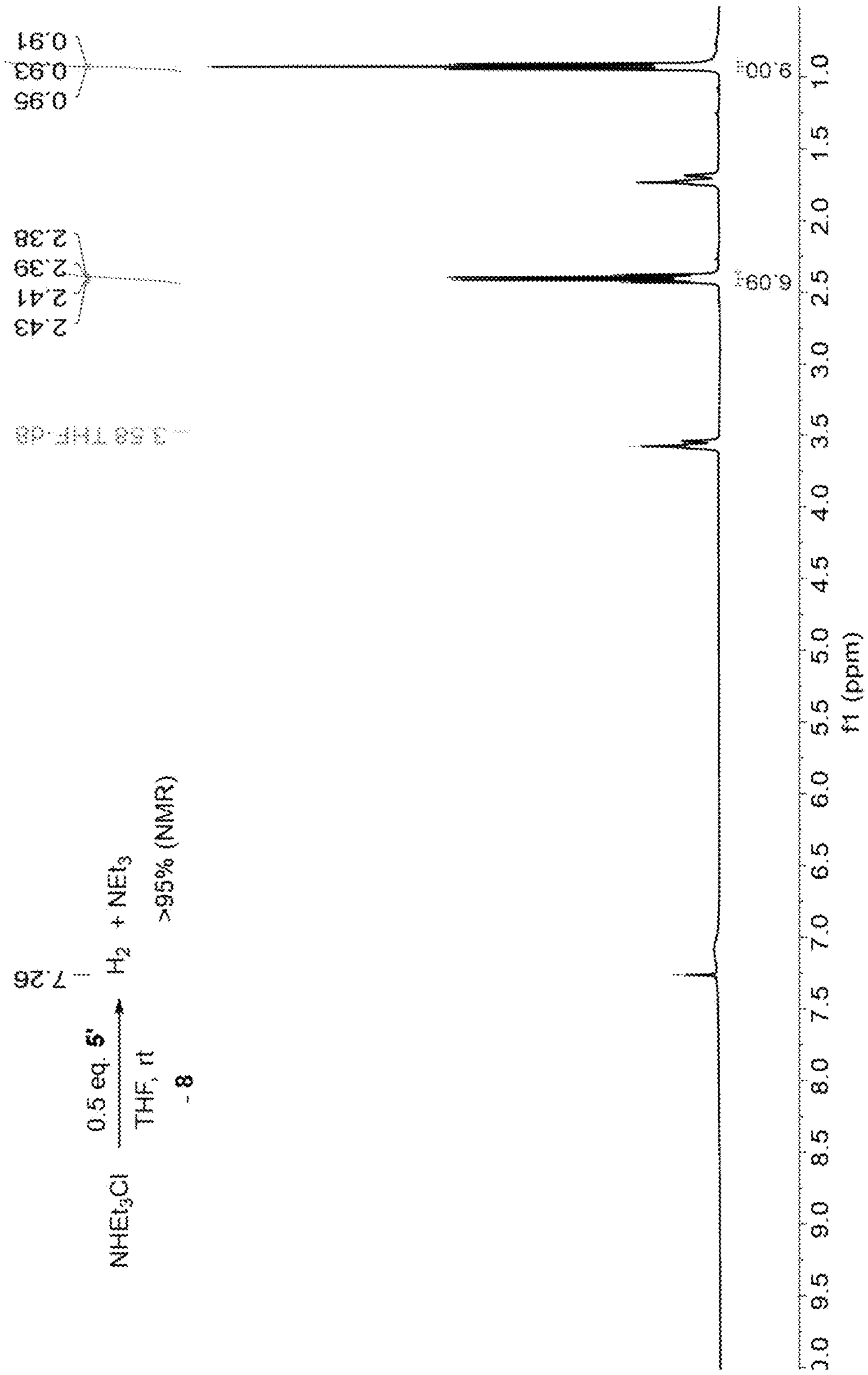
FIG. 14 shows the $^1H$ NMR spectrum of $NHEt_3Cl$ reactions in THF-$d_8$ corresponding to FIG. 13.
Figure 15A:
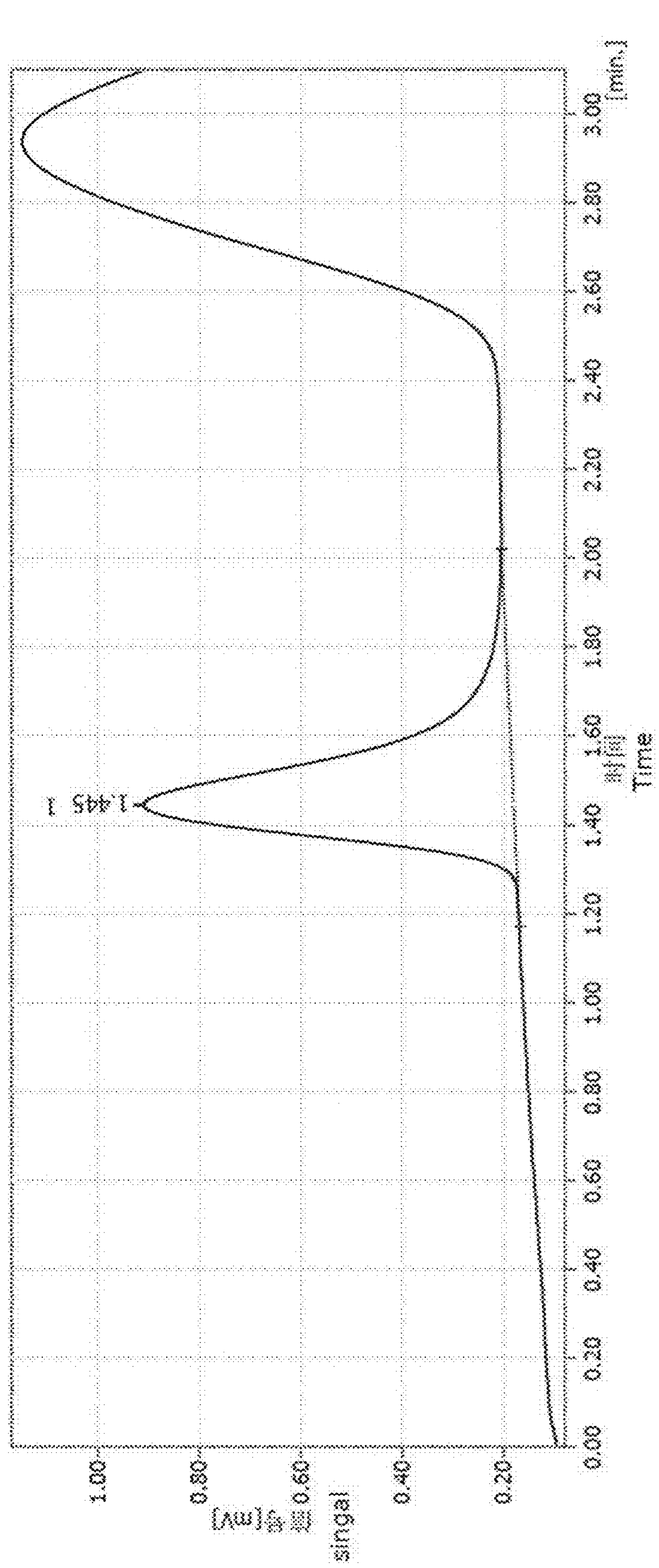
FIG. 15A shows the GC spectra of the $NHEt_3Cl$ reaction corresponding to FIG. 13.
Figure 15B:
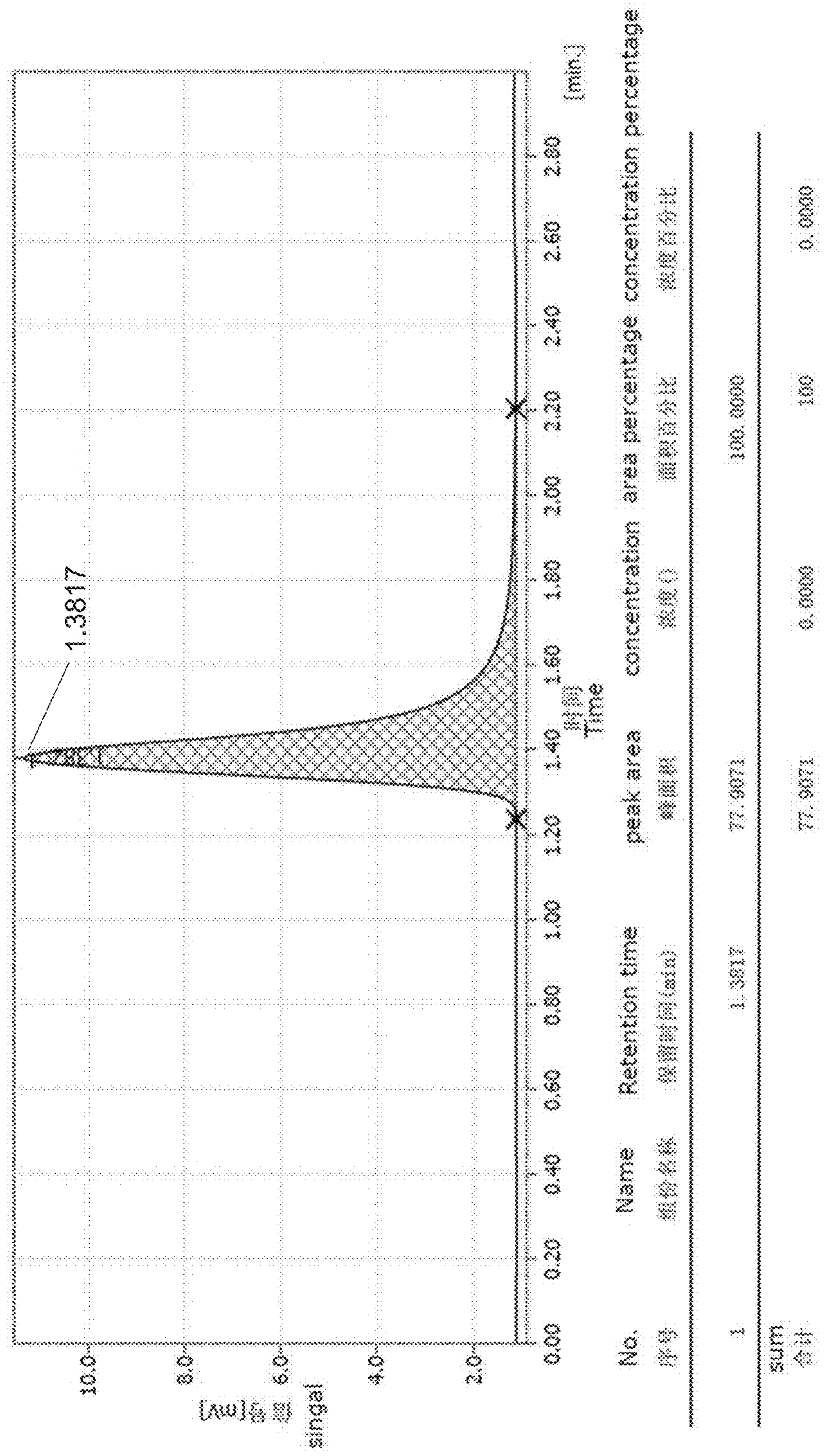
FIG. 15B shows the GC spectra of pure $H_2$.
Figure 15C:
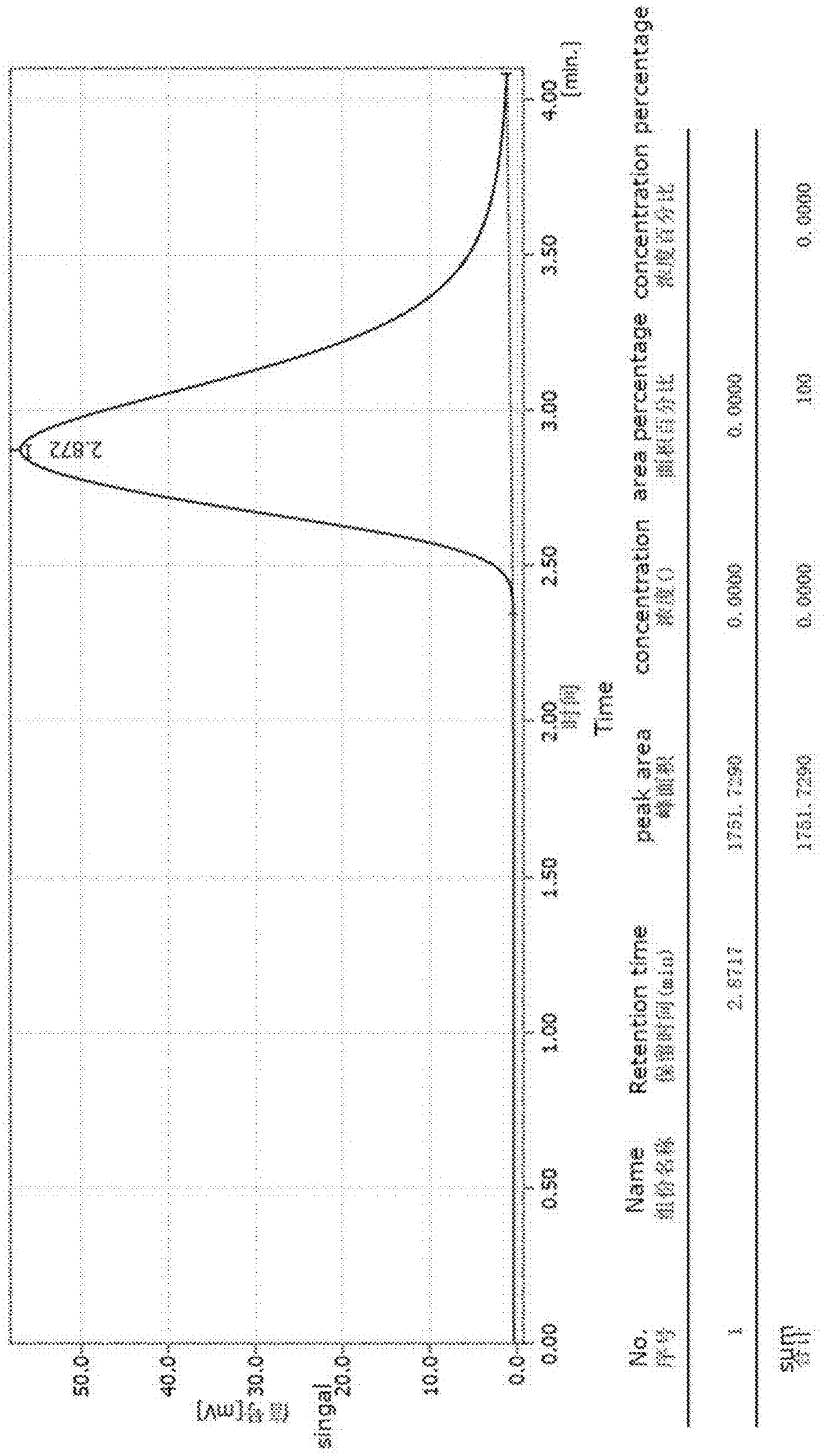
FIG. 15C shows the GC spectra of pure air in laboratory setting.

The reaction scheme is illustrated in FIG. 13. Specifically, compound 5' (50 mg, 0.10 mmol, 1.0 eq.) and $NHEt_3Cl$ (27 mg, 0.20 mmol, 2.0 eq.) were mixed in THF-$d_8$ (0.55 mL) at room temperature. After 12 hours, the clean generation of $NEt_3$ was observed in $^1H$ NMR (FIG. 14), and the formation of $H_2$ was confirmed by GC spectra (FIGS. 15A-15C).

Example 12

Reductive Pyridine Coupling

Figure 16:
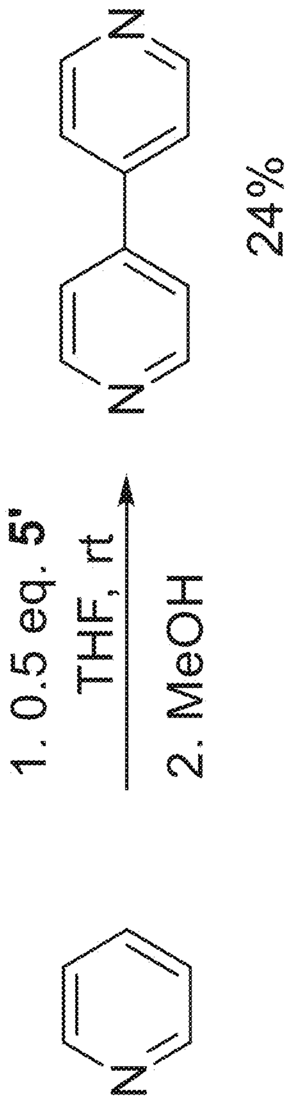
FIG. 16 is a schematic diagram illustrating the direct C—C coupling of pyridine by $[K(THF)_2][(bipy)BPh_2](5')$.

The reaction scheme is illustrated in FIG. 16. Specifically, To the THF solution (3 mL) of 5' (100 mg, 0.20 mmol, 1.0 eq.) was added pyridine (32 mg, 0.40 mmol, 2.0 eq.). The reaction was stirred at room temperature for 5 days or 60° C. overnight. Drops of MeOH were added to quench the reaction. 4,4'-bipyridine was isolated using PTLC (EA: DCM=2:1, 1% $NEt_3$) and obtained as a yellow powder (7.6 mg, 24%). 4,4'-bipyridine: $^1H$ NMR (400 MHz, $CDCl_3$, 298K): δ [ppm]=8.74 (dd, $J_{H-H}$=1.7 Hz, 4H), 7.53 (dd, $J_{H-H}$=1.7 Hz, 4H).

Example 13

Reduction of Acridine

Figure 17:
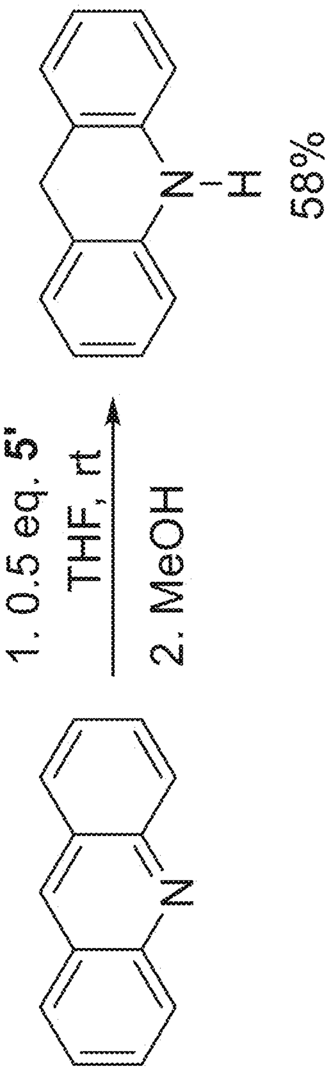
FIG. 17 is a schematic diagram illustrating the Birch reaction of acridine assisted by $[K(THF)_2][(bipy)BPh_2](5')$.

The reaction scheme is illustrated in FIG. 17. Specifically, to the solid mixture of 5' (50 mg, 0.10 mmol, 1.0 eq.) and acridine (36 mg, 0.20 mmol, 2.0 eq.) was added THF (5 mL). The reaction was stirred at room temperature overnight. Drops of MeOH were added to quench the reaction. Acridan was isolated using PTLC (EA:hex=1:5) and obtained as a white powder (21 mg, 58%).

Acridan: $^1H$ NMR (400 MHz, $CDCl_3$, 298K): δ [ppm]=7.12-7.05 (m, 4H), 6.85 (td, $J_{H-H}$=7.4 Hz, 1.2 Hz, 2H), 6.67 (dd, $J_{H-H}$=7.8 Hz, 1.2 Hz, 2H), 5.96 (s, 1H), 4.06 (s, 2H).

Example 14A

$CO_2$ Reduction

Figure 18A:
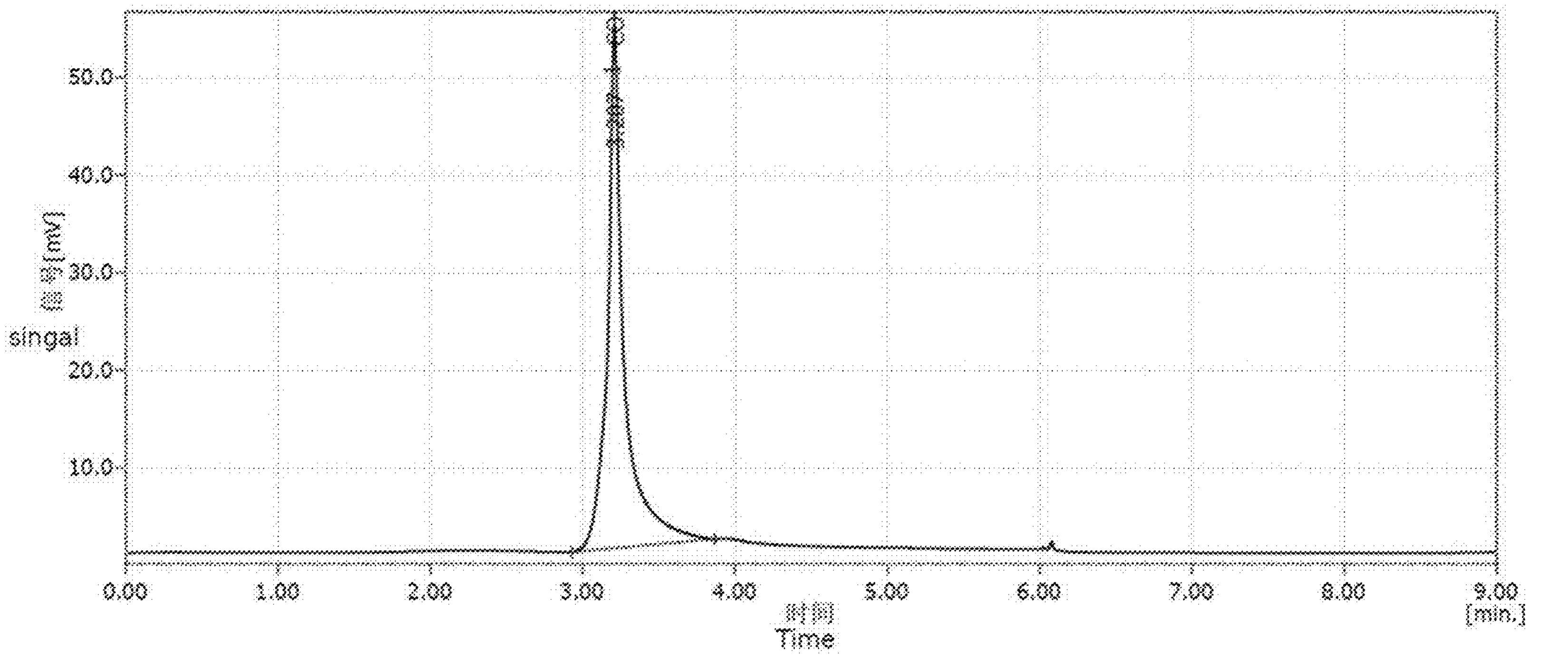
FIG. 18A shows the GC spectra of $CO_2$ reduction assisted by $[K(THF)_2][(bipy)BPh_2](5')$.
Figure 18B:
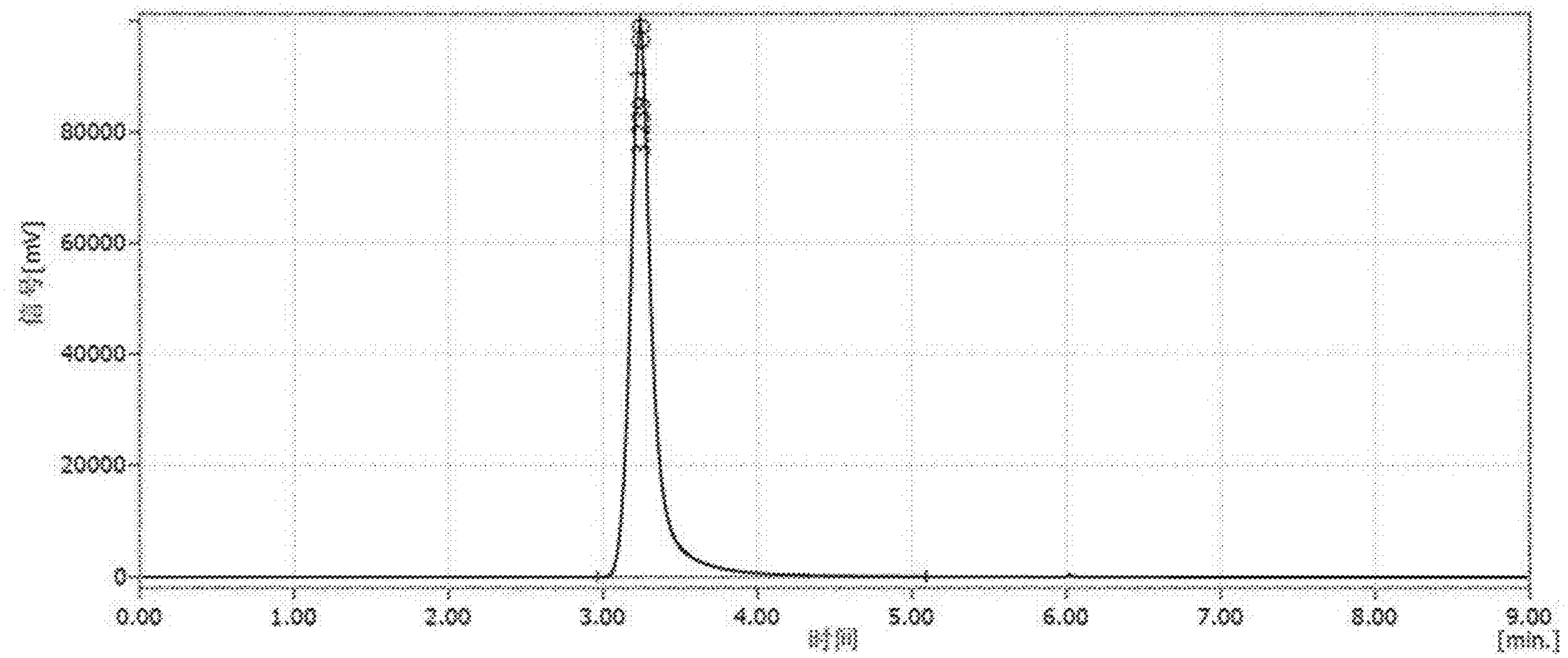
FIG. 18B shows the GC spectra of pure CO.
Figure 19:
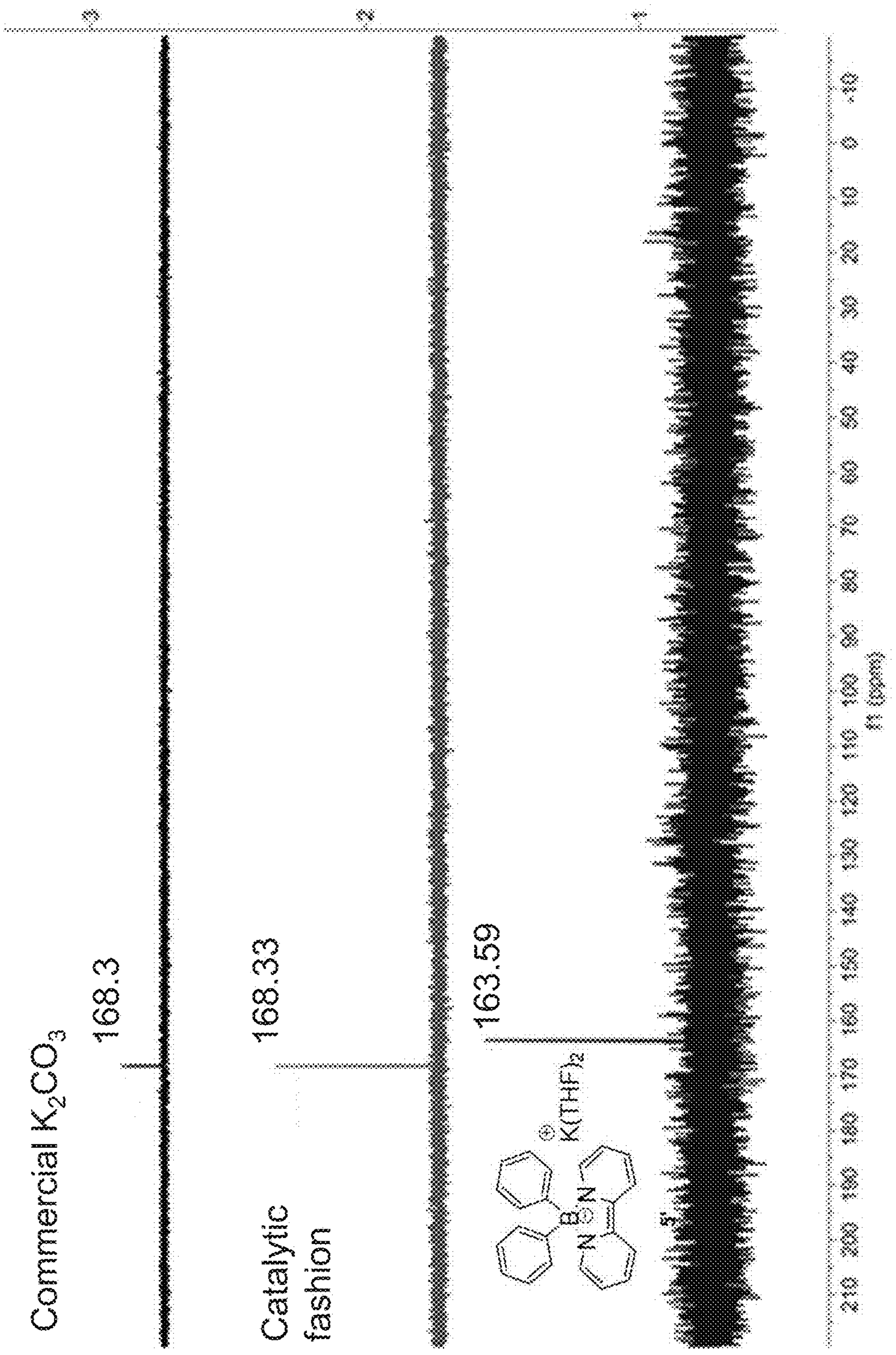
FIG. 19 shows the $^{13}C\{^1H\}$NMR of $CO_2$ reactions in $D_2O$.

The THF solution (10 mL) of 5' (50 mg, 0.10 mmol) was degassed in a 250 mL Schlenk tube. An atmosphere of $CO_2$ was then introduced to the reaction mixture. The reaction was stirred at room temperature overnight. A lot of insoluble solids precipitated. The generation of CO was confirmed by in-situ GC-spectra (FIGS. 18A and 18B). The solids were filtered and washed with THF (1 mL, thrice). The solids were soluble in $D_2O$. $^{13}C\{^1H\}$NMR (100 MHz, $D_2O$, 298K) spectroscopy was subsequently deployed, where a signal at δ (ppm)=163.59 was detected (FIG. 19). However, this signal disappeared after the addition of an excess of HCl (2M in dioxane).

Example 14B

$CO_2$ Reduction in a Catalytic Fashion

The THF solution (10 mL) of 5' (39 mg, 0.077 mmol, 1.0 eq.) and K (122 mg, 3.12 mmol, 40 eq.) was degassed in a 100 mL Schlenk tube. A controlled $CO_2$ atmosphere at 1 atm was introduced (100 mL, about 4 mmol). After being stirred at room temperature for three days, the solution underwent a transformation whereby the potassium was no longer visible, and a lot of insoluble solids precipitated. All the volatiles were reduced from the setup, and the resultant organic products were meticulously rinsed using acetone. After removing the acetone, $K_2CO_3$ was obtained as a grey powder (152 mg, 70%). $^{13}C\{^1H\}$NMR (100 MHz, $D_2O$, 298K): δ [ppm]=168.33.

Example 15

Synthesis, Characterization, and Reactivity of Borate Anion

Figure 20:
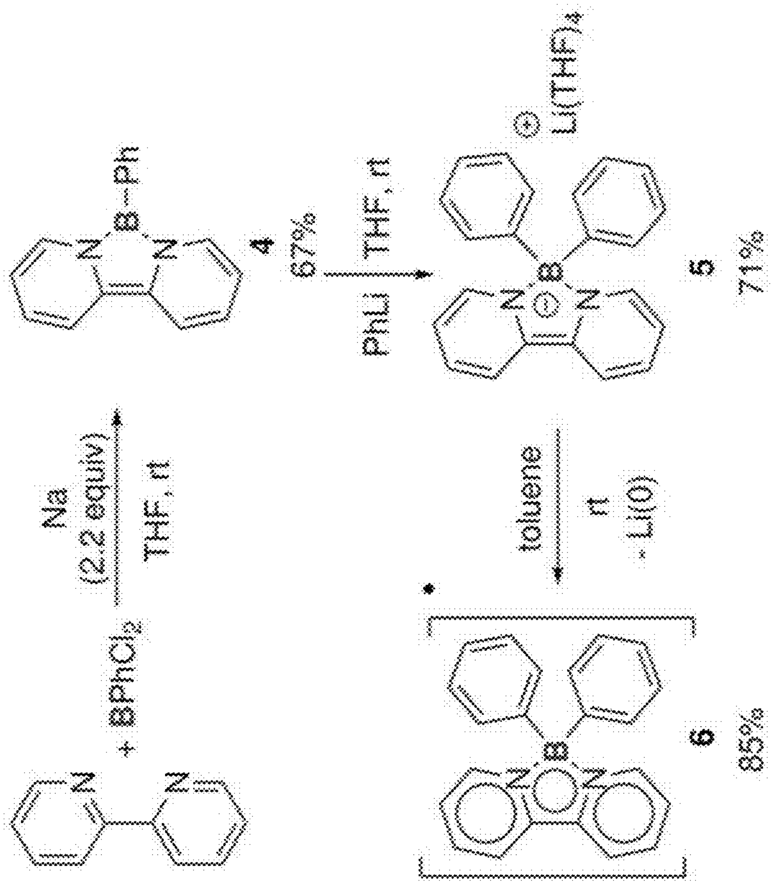
FIG. 20 is a schematic diagram illustrating the synthesis of borate anion 5 and boron radical 6. 5 was synthesized from compound 4 and PhLi, and the decomposition of 5 in toluene generated 6 and metallic lithium.

The borate anion 5 was synthesized through the direct reaction of PhLi and an organoboron species 4 (FIG. 20), the synthesis of which can be achieved through a one-pot fashion in 67% isolated yield on a gram scale.

Figure 21:
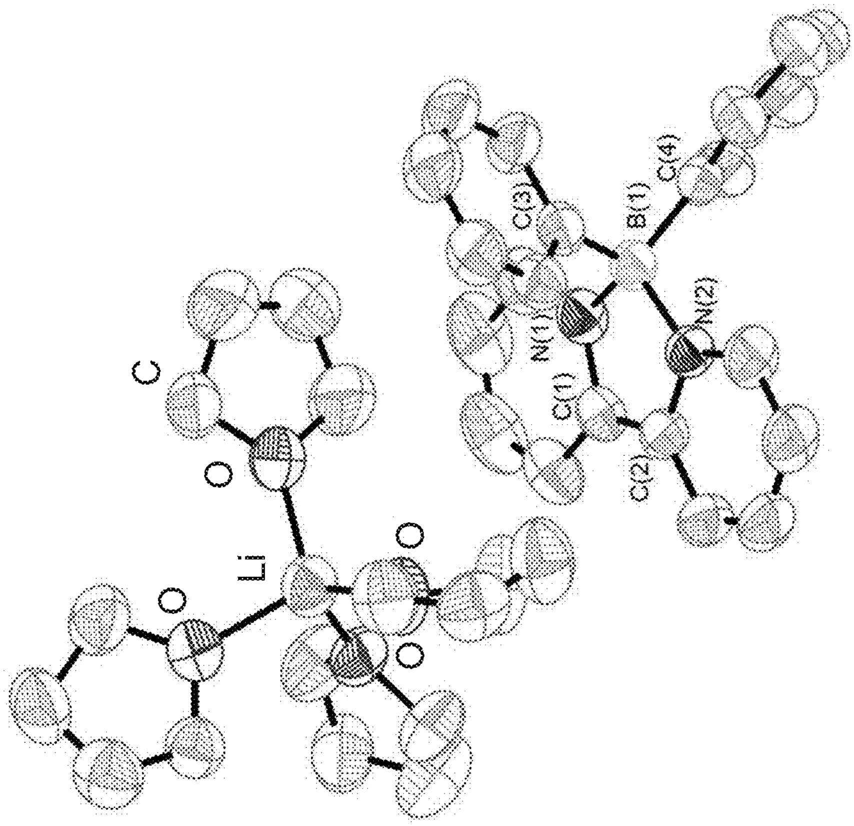
FIG. 21 shows the molecular structure of the borate anion 5 (thermal ellipsoids are set at the 50% probability level, and all hydrogen atoms are omitted for clarity). Selected bond distances (A) of compound 5: N1-B1 1.564(3), N2-B1 1.557(3), N1-C1 1.417(3), N2-C2 1.419(3), C1-C2 1.359(3)

In the $^{11}B$ NMR spectra, 5 exhibits a signal at 2.79 ppm, in agreement with the presence of a tetracoordinate boron center. The $^1H$ NMR spectra show four signals at 3.82, 4.64, 5.11, and 5.68 ppm, attributed to the protons from the bipyridine rings, indicating the dearomatization of bipyridine moieties in 5. The identity of 5 was unambiguously confirmed by X-ray single-crystal studies. The lithium cation was coordinated with four THF molecules in the solid state (FIG. 21, upper left). The bipyridine is believed to be in reduced form at the coordination sphere of early transition metals.

Figure 22:
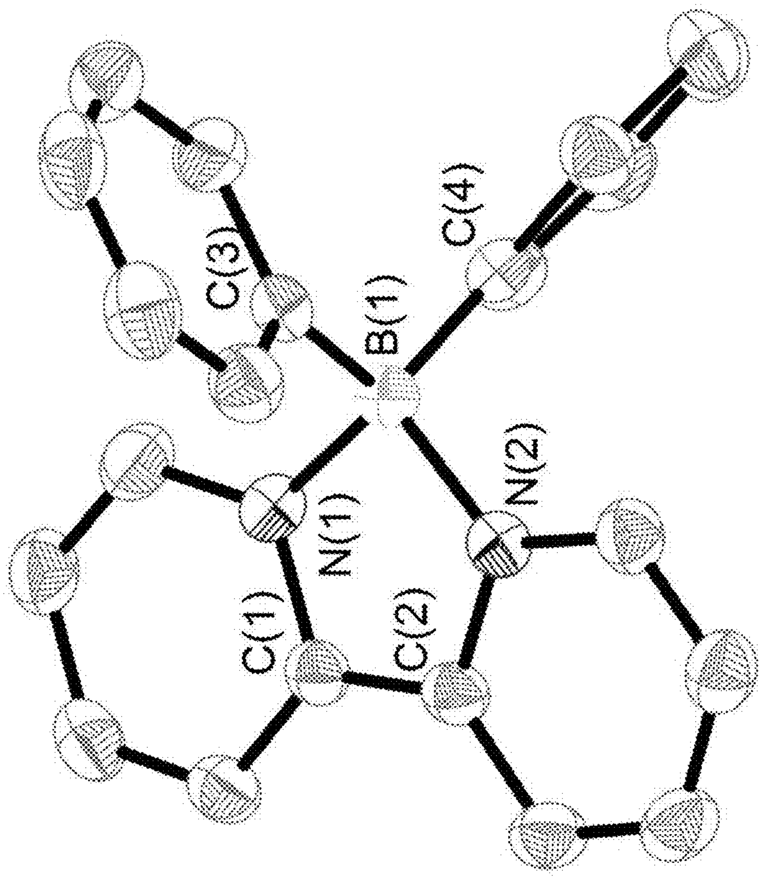
FIG. 22 shows the molecular structure of the boron radical 6 (thermal ellipsoids are set at the 50% probability level, and all hydrogen atoms are omitted for clarity). Selected bond distances (Å) of compound 6: N1-B1 1.590(3), N2-B1 1.578(3), N1-C1 1.386(3), N2-C2 1.386(3), C1-C2 1.404(3)
Figure 23:
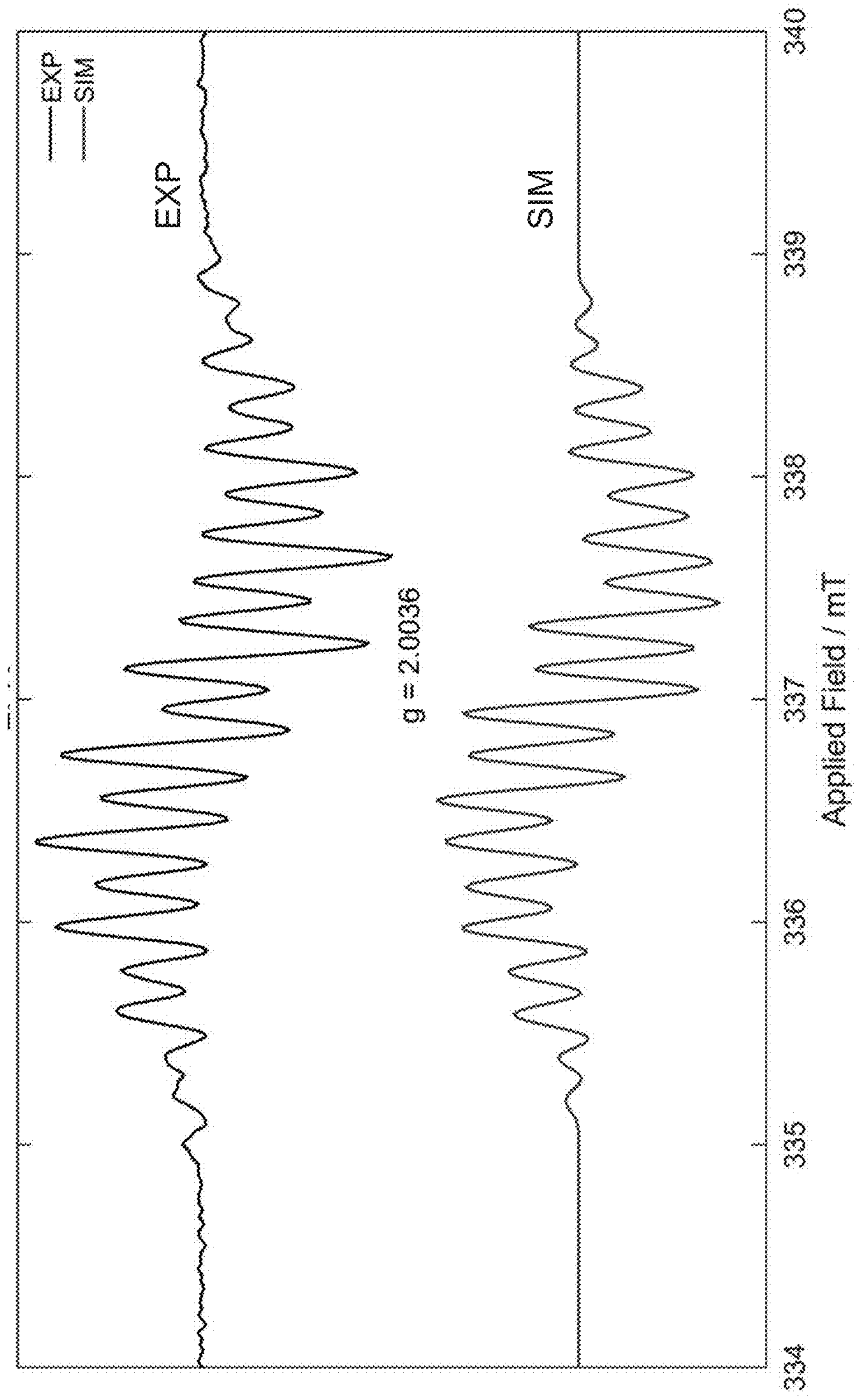
FIG. 23 shows the EPR spectra of compound 6 in toluene solution at room temperature, the simulation was performed on two isotopomers $(^{11}B)/(^{10}B)=4/1$, $a(^{10}B)=0.05$ G, $a(^{11}B)=0.16$ G, $a(^{14}N)=3.57$ G, $a(^1H)=1.01$, 7.77, 8.89, 10.77 G)

The borate anion 5 was stable in the THF solution. When the solvent was changed to toluene, 5 was gradually converted to an NMR silent species 6 and a black/dark green precipitate. Compound 6 was isolated in 85% yields (FIG. 20) and characterized by single-crystal X-ray analyses, revealing the presence of a tetra-coordinated boron center similar to borate anion 5 (FIG. 22). Since compound 6 is a neutral species, it is believed that it is a radical species. The radical 6 was further analyzed by EPR spectra in a toluene solution at room temperature. An EPR signal (centered at $g_{iso}$=2.0036) was observed (FIG. 23). The experimental data were then compared with the simulated one, and the hyperfine splitting (a($^{10}$B, 19.9%)=0.05 G, a($^{11}$B, 80.1%)=0.16 G, a($^{14}$N)=3.57 G, a($^{1}$H)=1.01, 7.77, 8.89, 10.77 G) suggests that the spin density is mainly delocalized in the bipyridine and $BN_2C_2$ rings.

Figure 24:
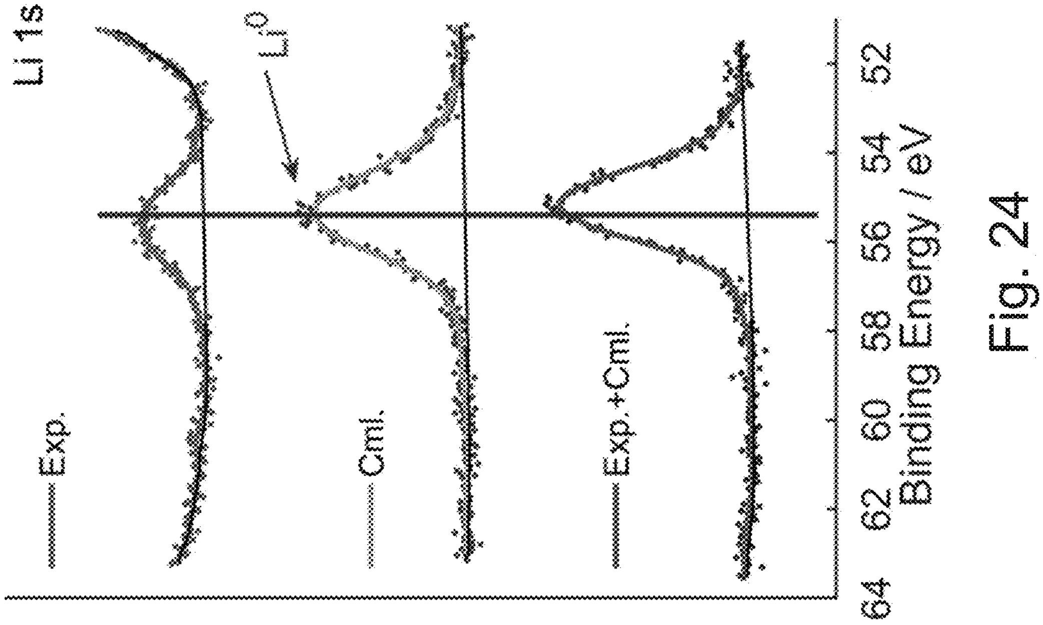
FIG. 24 shows the XPS spectra of lithium-containing products (top), commercial metallic lithium (middle), and the mixture of our lithium-containing products/commercial metallic lithium (bottom). XPS Analysis was acquired on Thermo Scientific K-Alpha.
Figure 25:
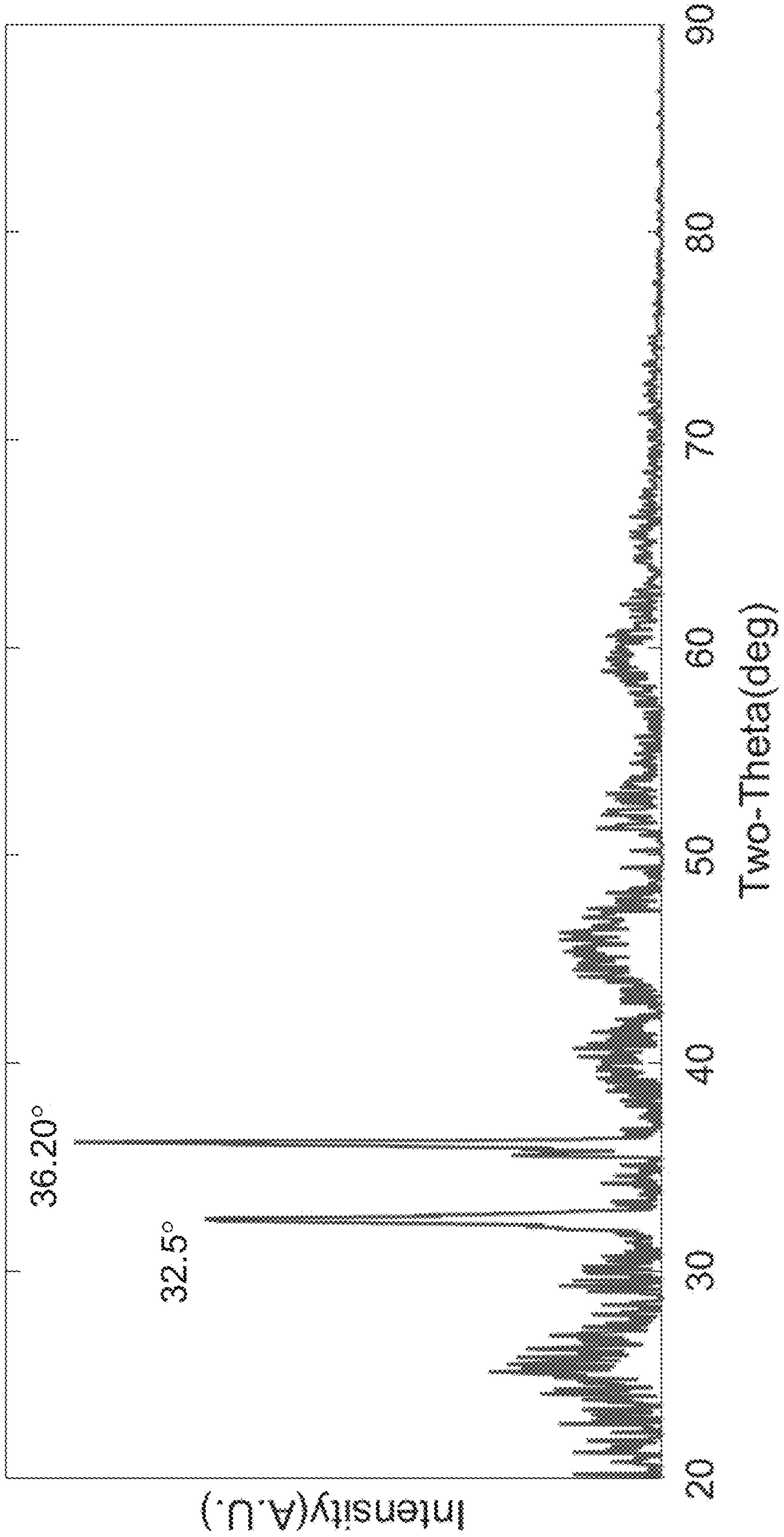
FIG. 25 shows the powder XRD of the residue formed in the synthesis of compound 6 confirmed as Li(0)

Besides, attempts have been made to identify the lithium-containing species in the product during the formation of radical 6. Since compound 6 was isolated in a high yield (85%), and no other side products were traced by NMR spectra, it is believed that lithium cations might be converted into Li(0) species. To verify this, the black precipitate generated from the reaction was collected, and the X-ray photoelectron spectroscopy (XPS) data of the lithium products showed a signal at 54.58 eV, which is close to that of commercial lithium samples at 54.38 eV (FIG. 24). X-ray powder diffraction and inductively coupled plasma-optical emission spectroscopy (ICP-OES) were also utilized to characterize the products (FIG. 25). High-intensity peaks appeared at 2θ=32.50°, 36.200 of the XPS spectra were in good agreement with the reported data of lithium powder. In addition, ICP-OES results indicate that the lithium metal accounts about 0.64 mg (about 42.6%) of the sample. These results clearly confirmed the presence of lithium (0) species in the products. Furthermore, the reduction of lithium cation was supported by computation studies, showing that such a redox process is thermodynamically favored (ΔG=−51.82 kcal/mol) (data not shown). Without wishing to be bound by theory, it is believed that the above disclosure may represent a rare example of lithium cation reduction within an organic species, particularly within the borate anion of the present invention.

Figure 26A:
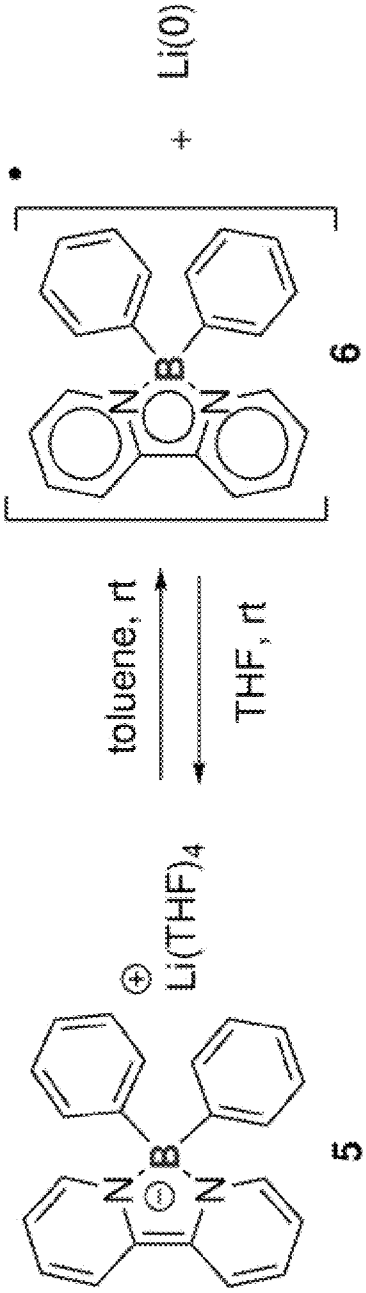
FIG. 26A is a schematic diagram illustrating the formation of boron radical 6 and the regeneration of borate anion 5.
Figure 26B:
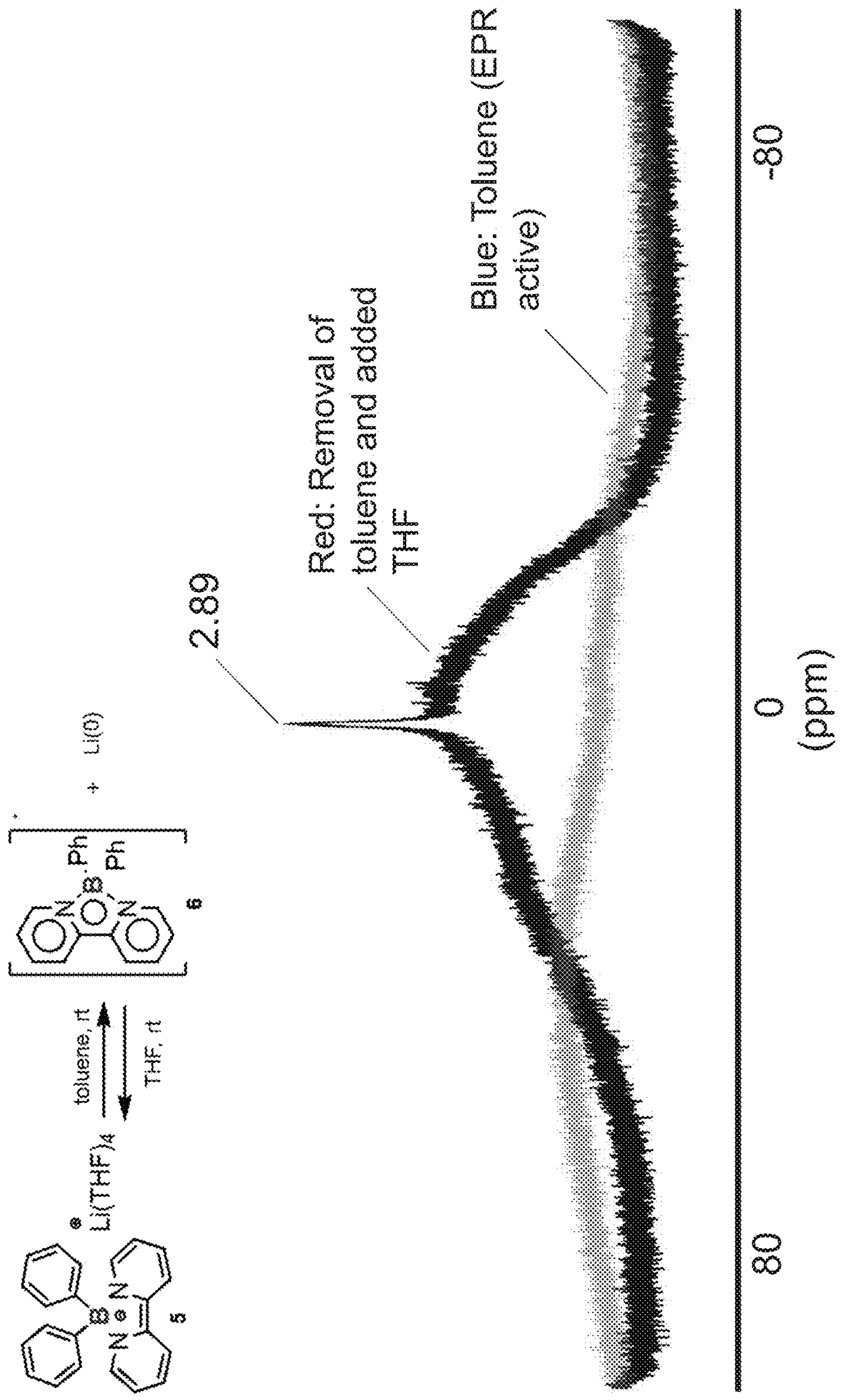
FIG. 26B shows the $^{11}B$ NMR of the borate anion 5 in toluene or in THF. Blue: toluene (EPR active); Red: removal of toluene and add THF.

When THF was added to the mixture of compound 6 and in-situ generated Li(0), borate anion 5 was clearly regenerated (FIGS. 26A and 26B). Furthermore, when 12-crown-4 ether and compound 5 were mixed in toluene, no formation of compound 6 was observed (FIG. 6), as confirmed by the EPR (FIG. 7), indicating that the coordination of THF or crown ether is crucial for the stabilization of lithium cations in 5. Additionally, the reaction of compound 4 and PhLi in toluene generated compound 6 with a 94% yield (FIG. 5A). In these transformations, it is demonstrated that the choice of solvent can control the generation of boron radical or borate anion.

Figure 27:
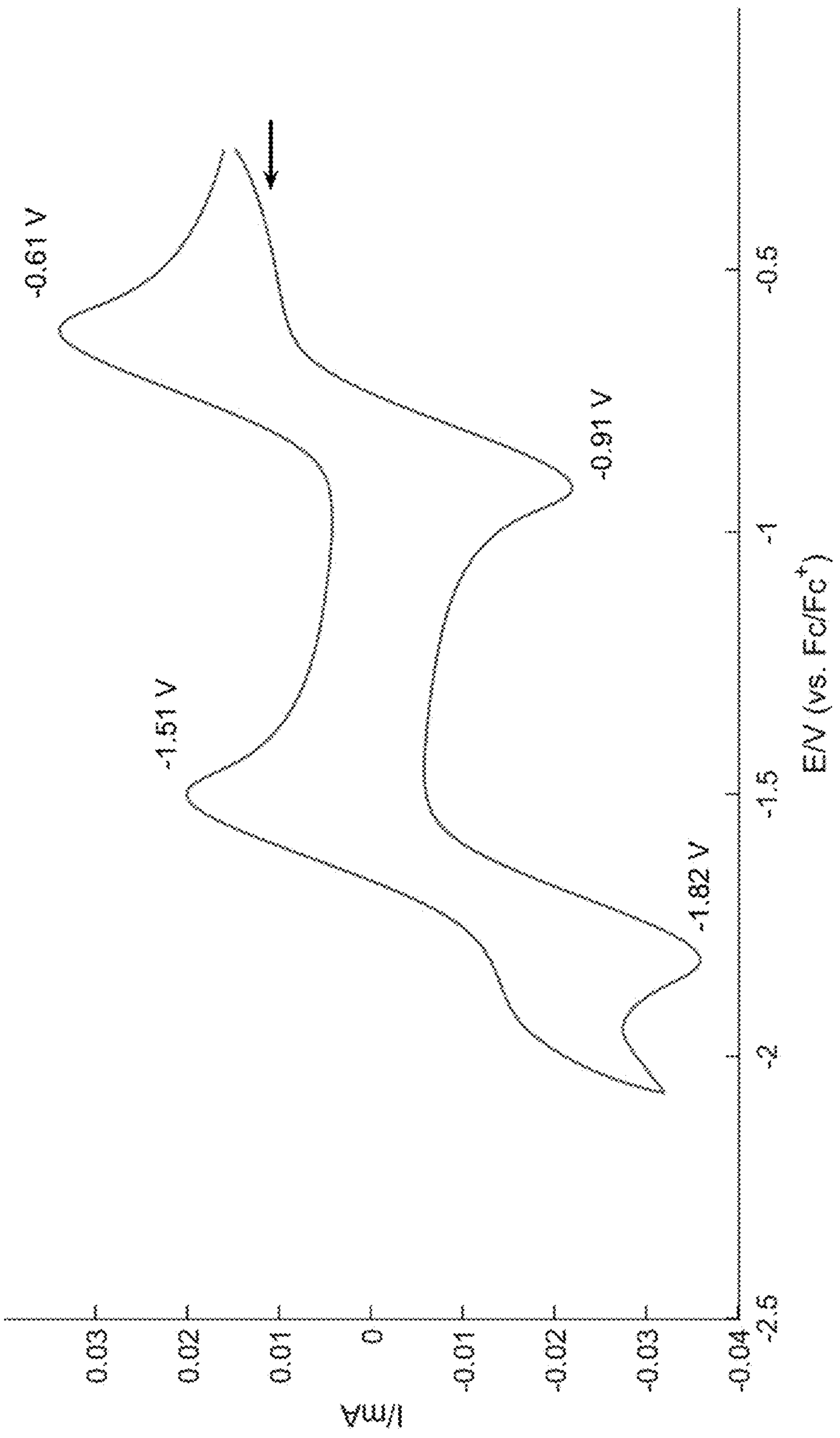
FIG. 27 shows the cyclic voltammograms (CVs) of the boron radical 6 in THF solution containing 0.1 M [nBu4N][PF6]) at room temperature (scan rate: 100 mV/s)
Figure 28:
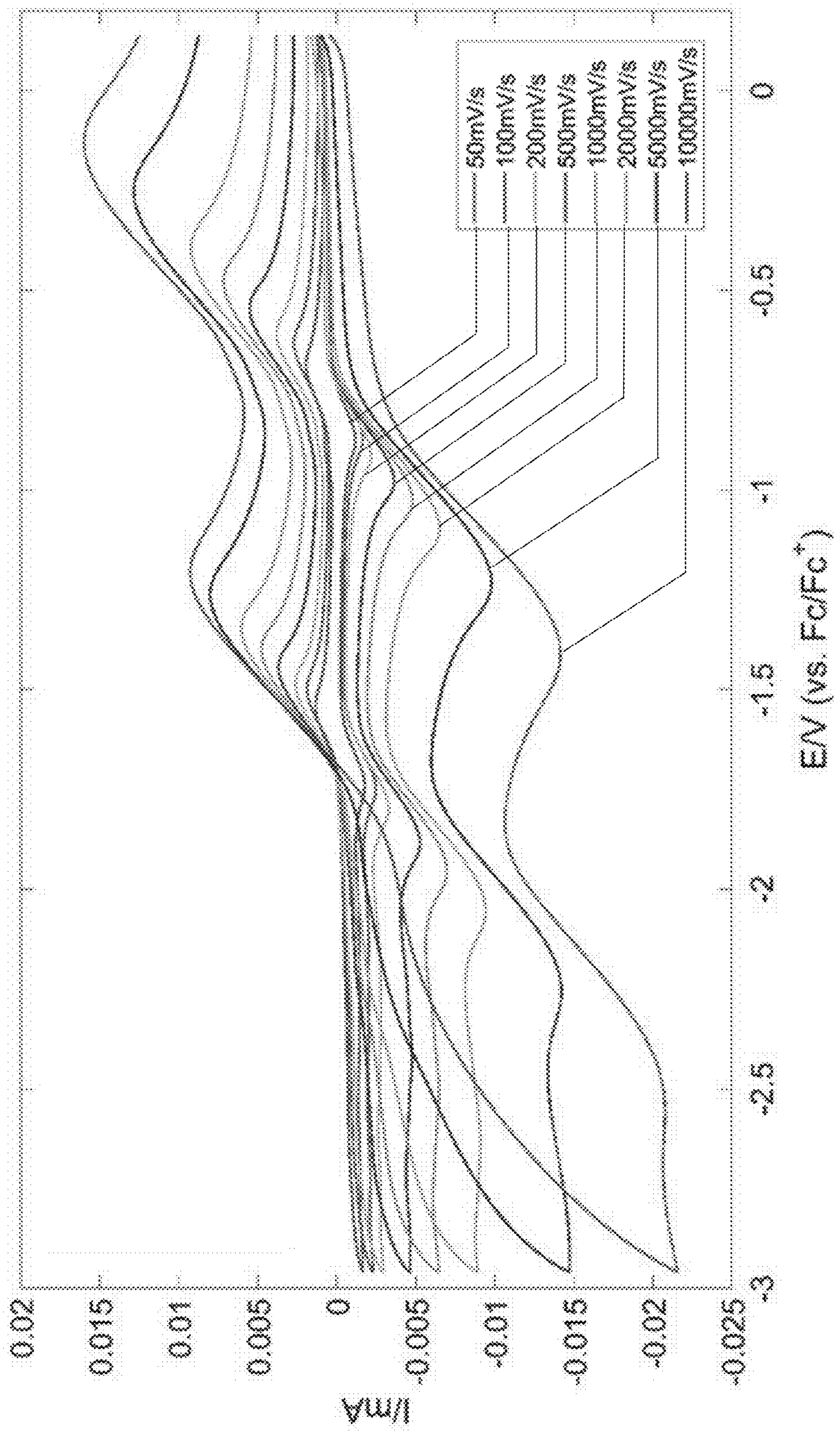
FIG. 28 shows the cyclic voltammograms (CVs) of boron radical 6 in THF solution containing 0.1 M [nBu4N][PF6]) at room temperature with different scan rates.

The redox properties of 6 were studied by cyclic voltammetry (CV) in THF solutions. A quasi-reversible process involving two reductions was observed in the CV spectra (FIG. 27). The second reduction occurs at −1.82 V vs. $Fc/Fc^+$, attributed to the reduced anionic species of radical 6. Under electrochemical conditions, this borate anion can be oxidized to radical 6, as shown in the first oxidation potential at −1.51 V; the second oxidation appears at −0.61 V, indicating the formation of boron cations; the reduction of boron cations at −0.91 V regenerates the radical 6. Both the cationic and anionic derivatives of 6 were stable under electrochemical conditions (FIG. 28).

Figure 29:
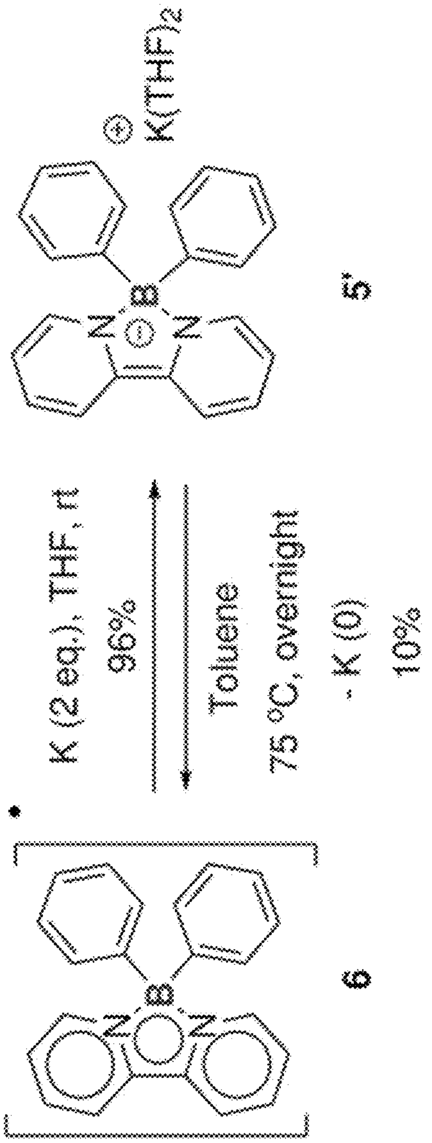
FIG. 29 is a schematic diagram illustrating the formation of borate anion 5' and boron radical 6 is controllable by different reaction conditions.

In agreement with the CV experiment, radical 6 can be reduced by potassium in THF, affording the borate anion 5' in a 96% isolated yield (FIG. 29). Compound 5' was fully characterized by NMR and HRMS spectra. Contrary to lithium borate anion 5, the potassium borate anion 5' was stable in both THF and toluene, and no decomposition was observed at room temperature. However, when heating at 75° C. in toluene, 5' was converted to radical 6 in a 10% isolated yield. And the reduction of $K^+$ into metallic potassium was confirmed by ICP-OES, which shows that potassium metal accounts for about 0.099 mg od the sample.

Figure 30:
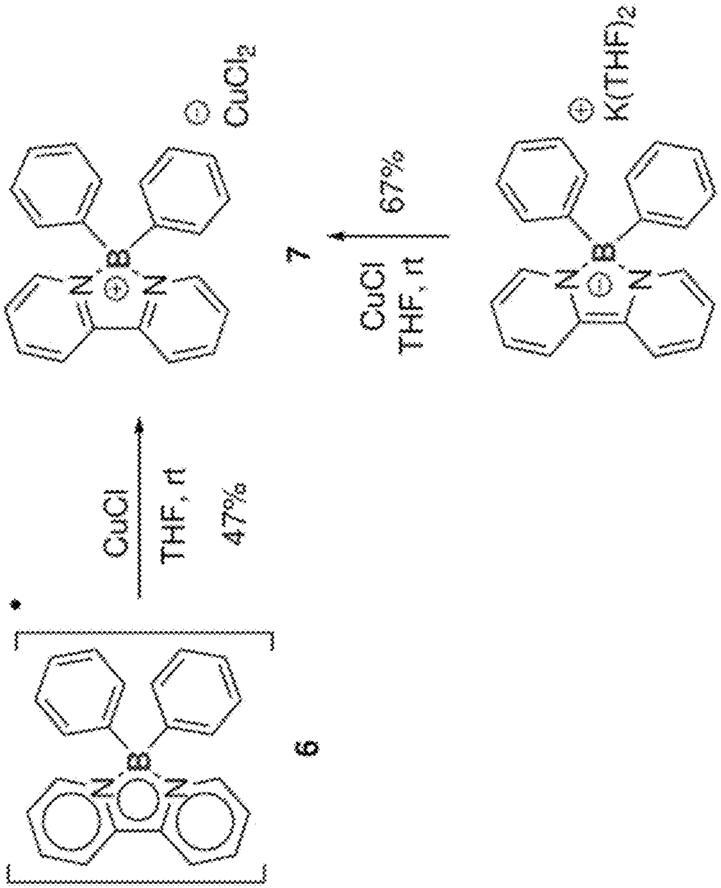
FIG. 30 is a schematic diagram illustrating either the borate anion 5' or the boron radical 6 can undergo oxidation to yield compound 7 in the presence of CuCl.
Figure 31:
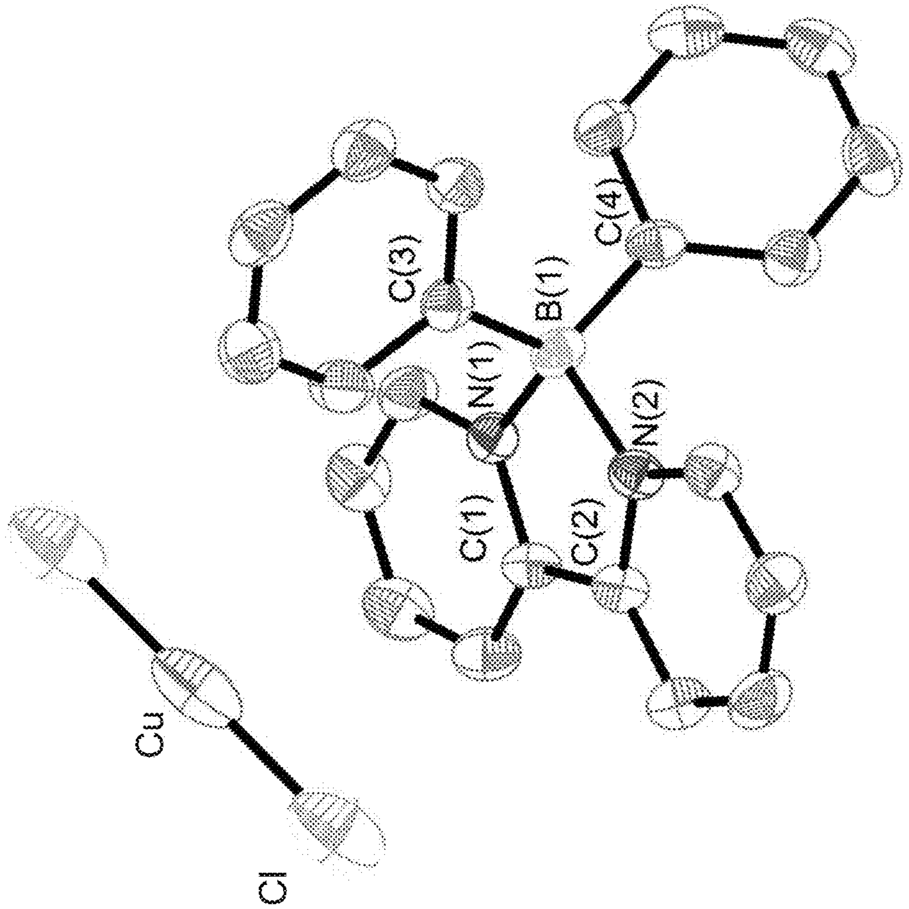
FIG. 31 shows the molecular structure of compound 7 (thermal ellipsoids are set at the 50% probability level, and all hydrogen atoms are omitted for clarity). Selected bond distances (Å): N1-B1 1.614(6), N2-B1 1.601(6), N1-C1 1.352(6), N2-C2 1.346(6), C1-C2 1.469(6)

On the other hand, the radical 6 can be oxidized to boronium 7 by an excess of CuCl in a THF solution (FIG. 30). Compound 7 was successfully characterized by NMR, HRMS spectra, and single-crystal X-ray analyses (FIG. 31). The boron-containing frameworks of compounds 5, 6, and 7 bear similar geometries. However, the bond lengths of C1-C2 (1.359 Å), B1-N1 (1.564 Å), and B1-N2 (1.557 Å) in 5 are significantly shorter than those of 7 (1.469 Å, 1.601 Å, and 1.614 Å), revealing the non-aromatic feature of the two $C_5N$ rings. Furthermore, boronium 7 can be obtained through the oxidation of borate anion 5' (FIG. 30).

Example 16

Electronic Structure of Bipyridine-Stabilized Boron Compounds

Figure 32:
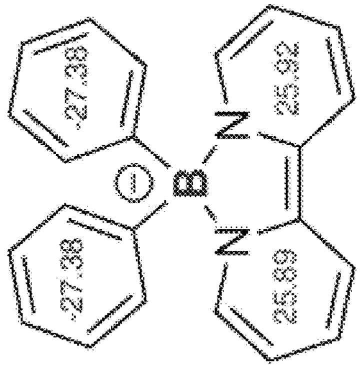
FIG. 32 shows the NICS(1) values of compounds 5, 6, and 7. Magnetic properties were calculated using the revTPSS/pcSseg-1 level of theory with optimized structures with the SMD solvent model.
Figure 32:
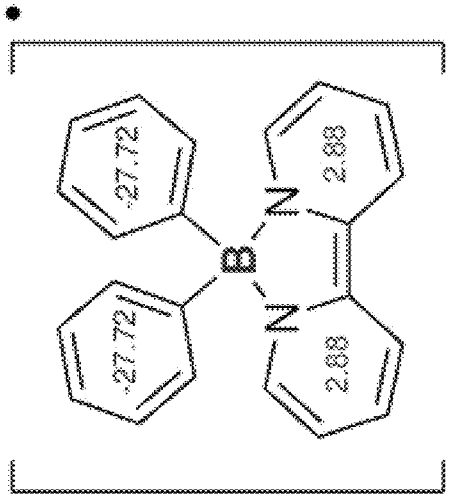
Figure 32:
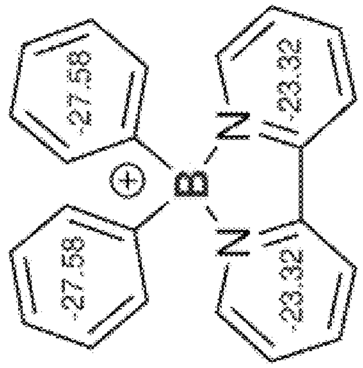
Figure 33A:
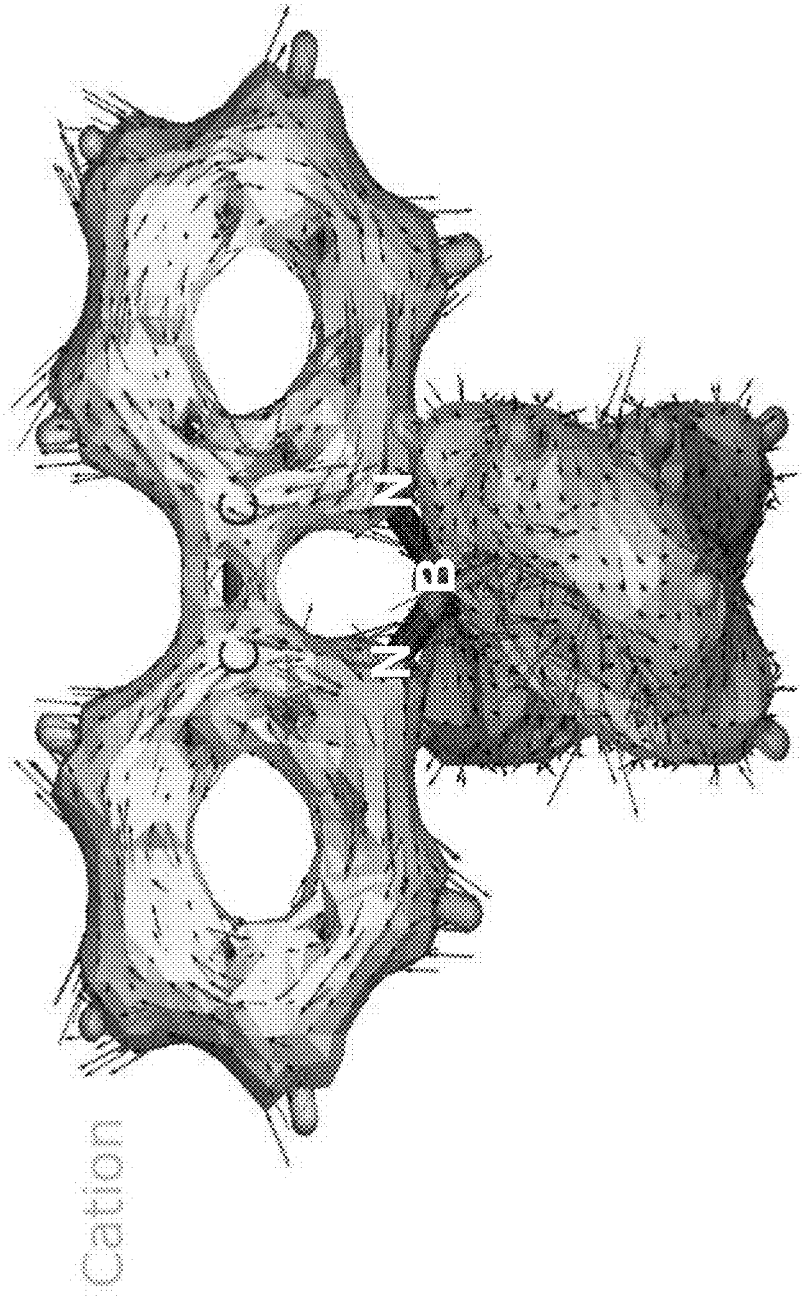
FIG. 33A shows the AICD of boronium. The direction of magnetic field is perpendicular to the paper and point to the reader.
Figure 33B:
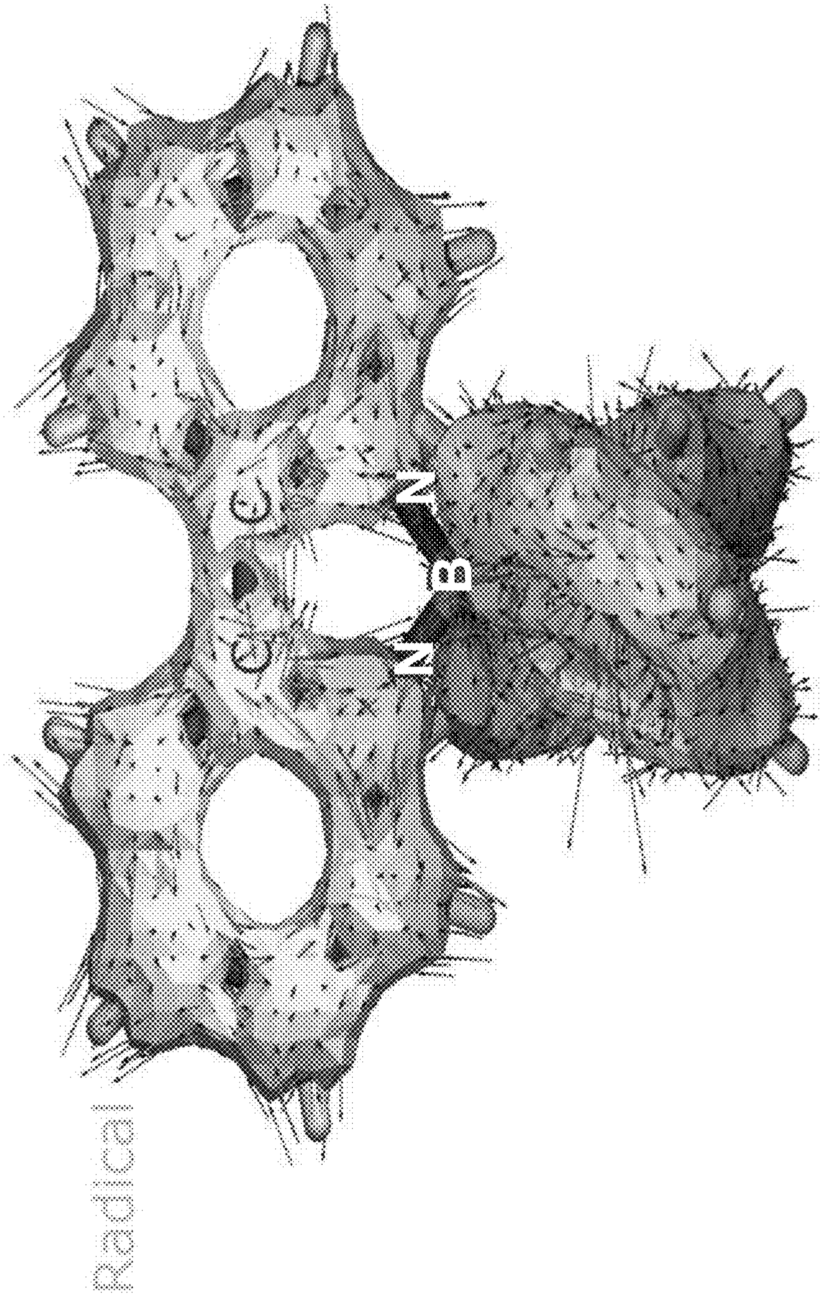
FIG. 33B shows the AICD of radical. The direction of magnetic field is perpendicular to the paper and point to the reader.
Figure 33C:
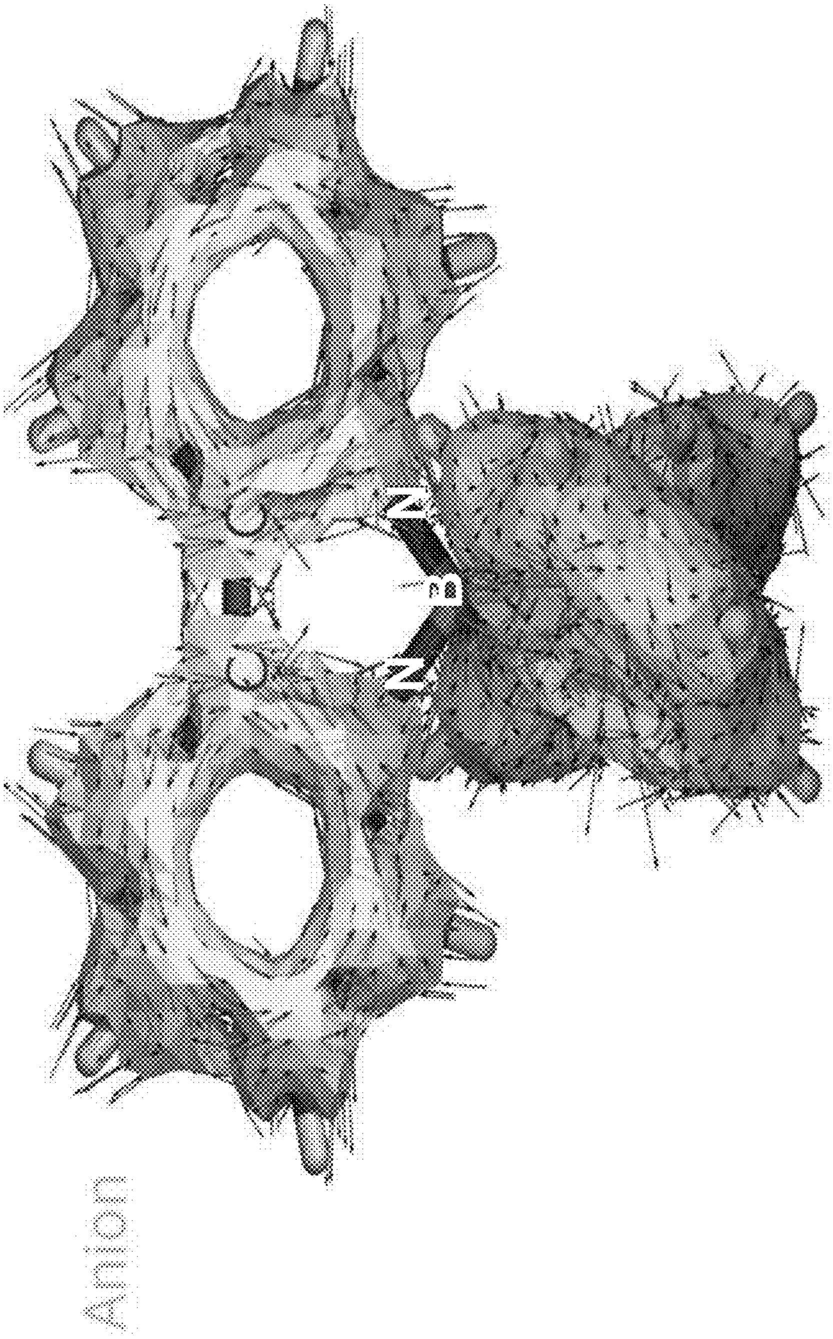
FIG. 33C shows the AICD of anion. The direction of magnetic field is perpendicular to the paper and point to the reader.

The aromatic characters of compounds 5, 6, and 7 were investigated through the nuclear independent chemical shift values at 1 Å above the center of each ring (NICS(1)). In general, NICS values of the two phenyl rings substituted at the boron atoms are negative and similar in these three species. In structures 5 and 6, the two $C_5N$ rings are dearomatized with positive NICS(1) values, especially for the borate anion 5, showing NICS(1) values of 25.89 and 25.92 (FIG. 32). In comparison, the two $C_5N$ rings in 7 are aromatic and exhibit negative NICS(1) values (−23.32). The extent of π-electron delocalization in 5-7 was further assessed through the analysis of current-induced density (ACID) anisotropy (FIGS. 33A-33C). These results are in good agreement with their structural information.

Figure 34:
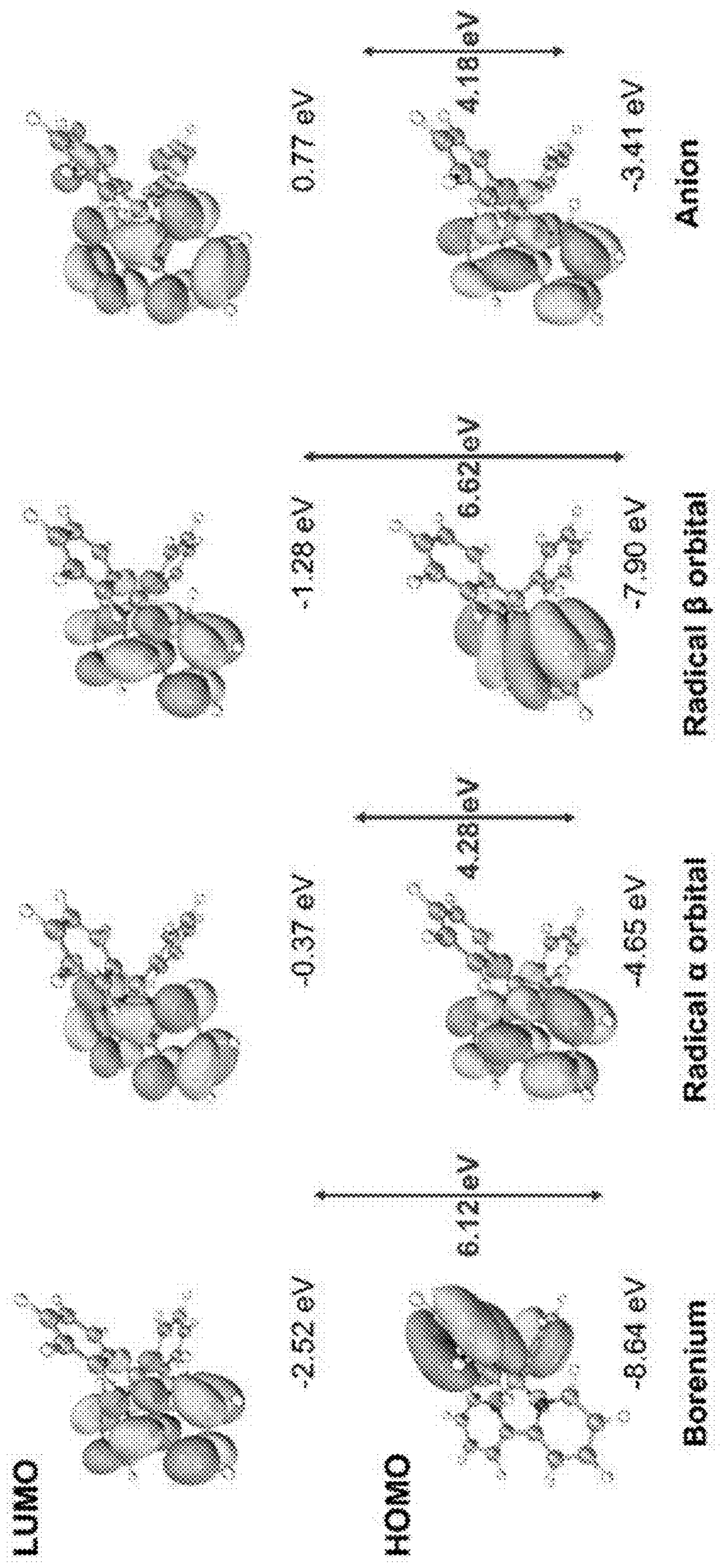
FIG. 34 shows the calculated LUMO and HOMO orbitals of boronium, boron radical, and boron anion (Isovalue: 0.03 a.u.)
Figure 35:
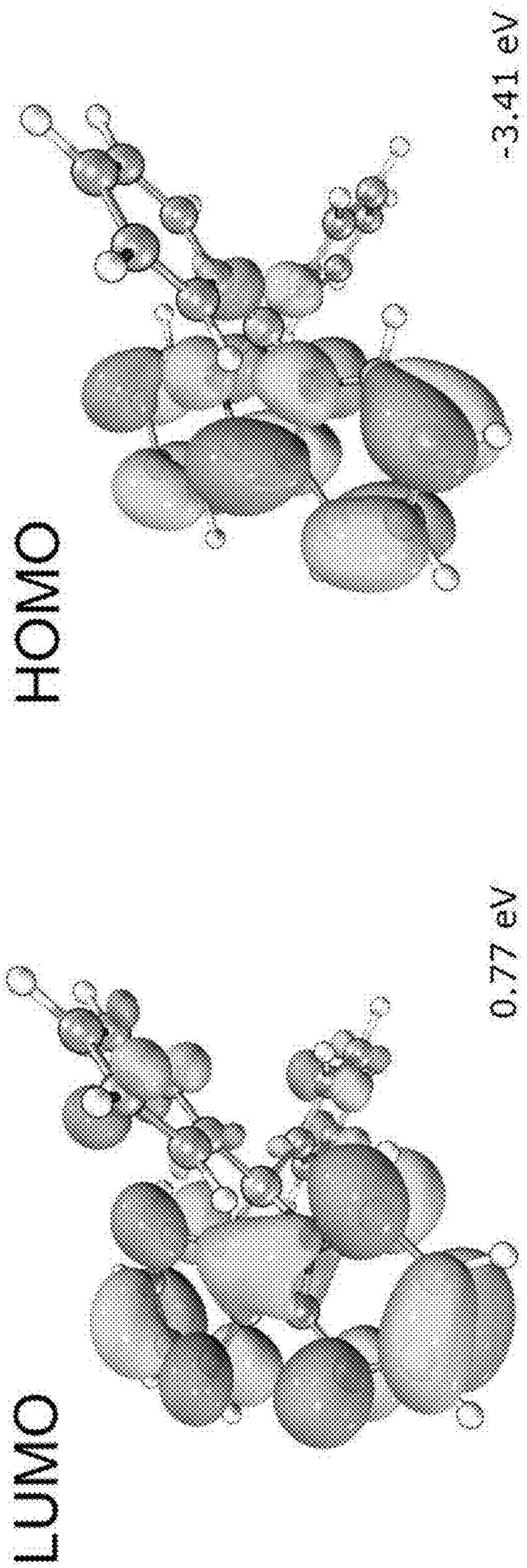
FIG. 35 shows the calculated LUMO and HOMO orbitals of anion 5. All calculations were carried out using ORCA (version 5.0.4)

Besides, DFT computation studies were performed to elucidate the electronic structure of compounds 5, 6, and 7. The LUMOs of these compounds are all distributed on the bipyridine rings. For anion 5 and radical 6, the bipyridine moieties also contribute mostly to the HOMOs, whereas the HOMO of boronium 7 is located on the two phenyl rings (FIG. 34). Moreover, anion 5 has the smallest HOMO-LUMO energy gap (4.18 eV) among the three derivatives (FIG. 35). These results indicate that the reactivity of compound 5 comes from the bipyridine moieties.

Example 17

Two-Electron-Transfer Reactivity of Borate Anion 5'

Figure 36:
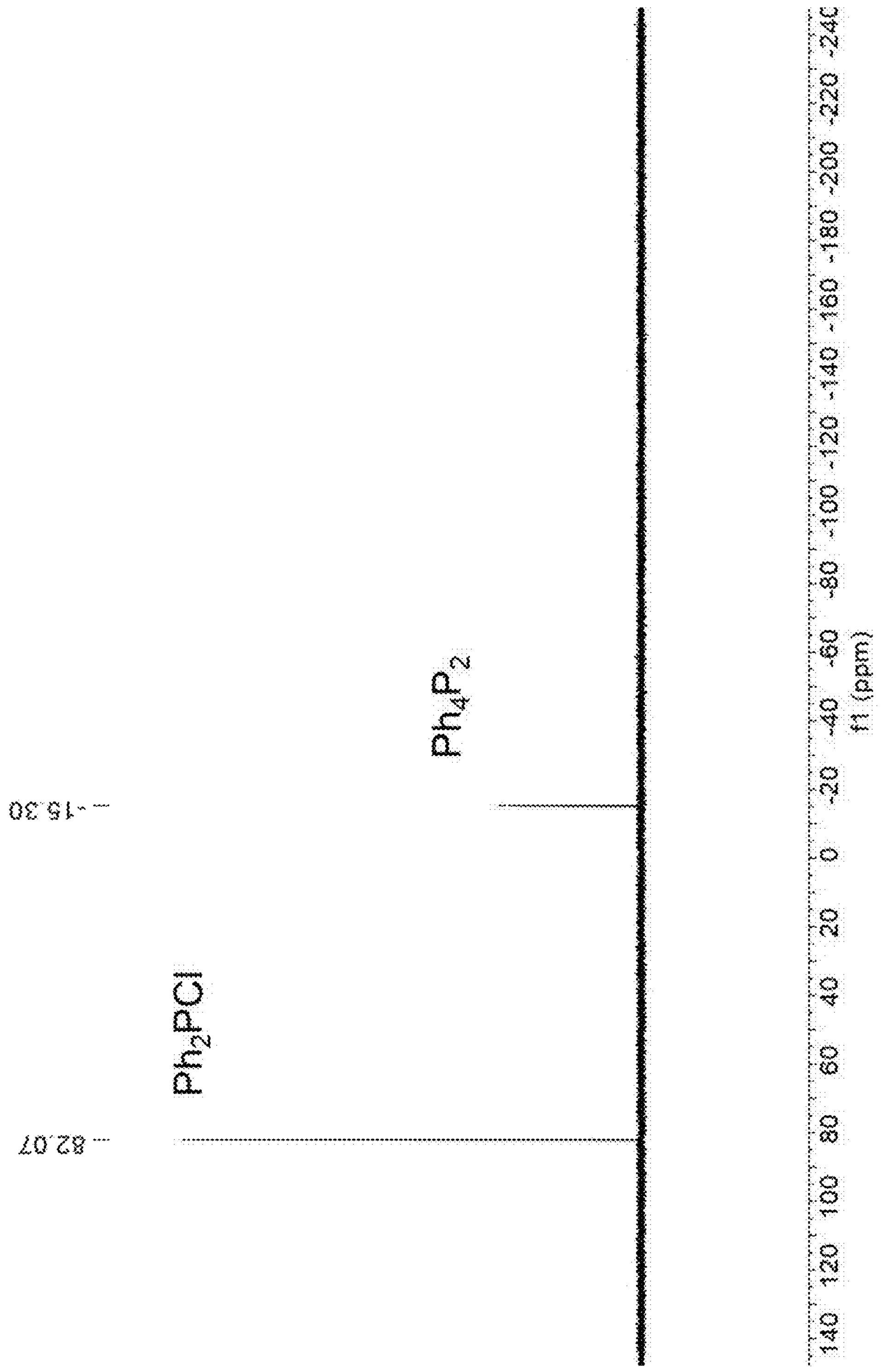
FIG. 36 shows the $^{31}P\{^1H\}$NMR in $C_6D_6$ for comparison (P—P), using sodium naphthalene as the reducing agent.

In view of the two-electron-transfer reactivity of 5', the application of borate anion 5' in reductive-coupling reactions was explored. $PPh_2Cl$ was chosen as the substrate to test the reactivity. The reaction of 5' and $PPh_2Cl$ (1:2) in THF solution was monitored at room temperature (FIG. 9A). Indeed, a P—P coupling product, $P_2Ph_4$, was isolated as the final product, showing a signal at −15.01 ppm in the $^{31}$P NMR spectra. The borate anion 5' was converted to the boronium 8 in 80% isolated yield, confirming that compound 5' acted as a two-electron-reducing agent in this reaction. Additionally, when a 1:1 mixture of the radical 6 and $PPh_2Cl$ reacted in THF at room temperature, $P_2Ph_4$ was isolated in 86% yield (FIG. 9B). In comparison, when using sodium naphthalene as the reducing reagent, a 21% generation of $P_2Ph_4$ was observed based on the $^{31}$P NMR (FIG. 36).

Figure 37:
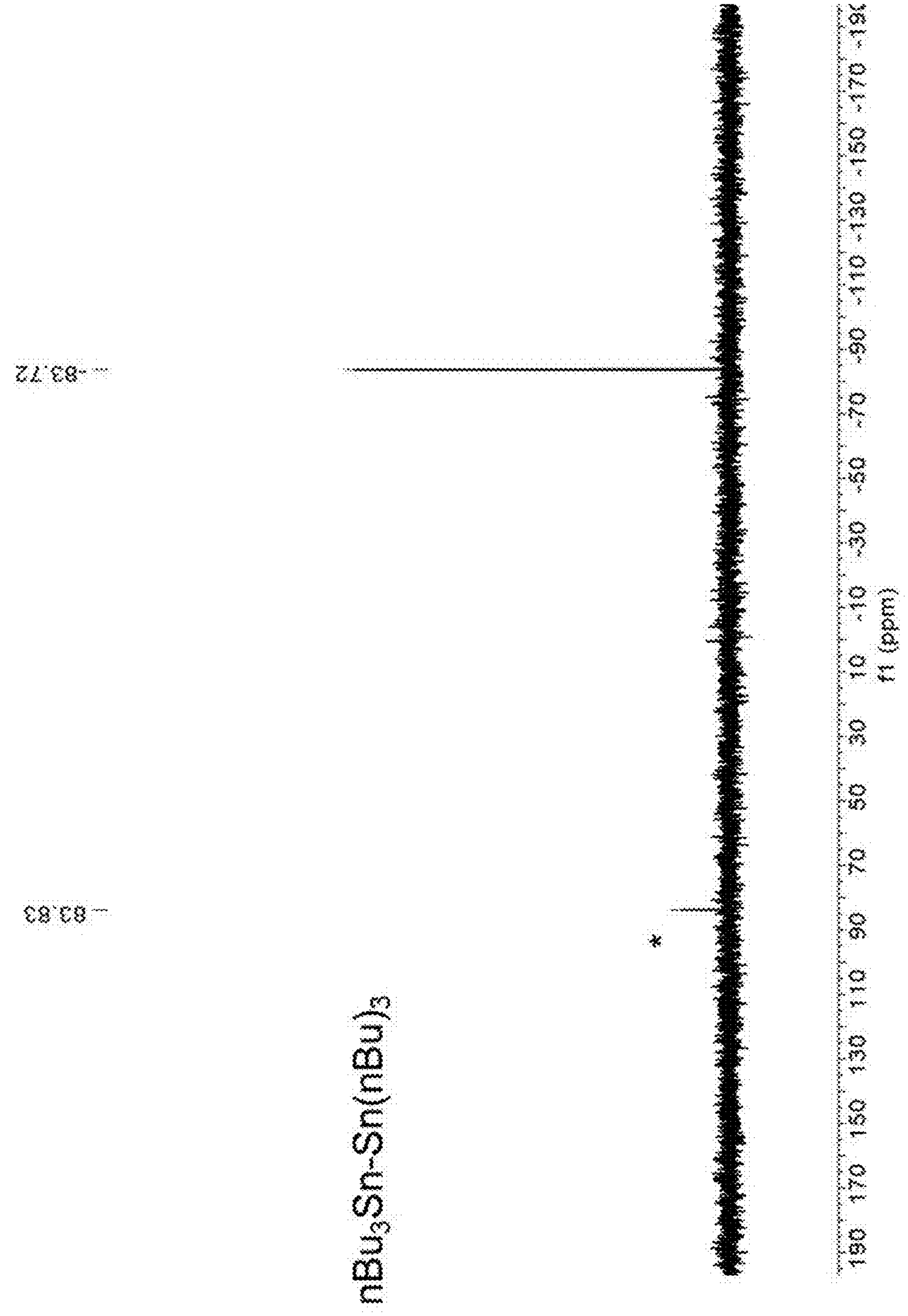
FIG. 37 shows the $^{119}Sn\{^1H\}$NMR of $nBu_6Sn_2$ in $C_6D_6$ (*: unknown impurity)

Moreover, compound 5' can also facilitate other element-element coupling reactions (FIGS. 10-13). For example, $nBu_3SnCl$ can be converted to $nBu_3Sn—Sn(nBu)_3$ in the presence of 5' (FIG. 10). The formation of the Sn—Sn bond in the final product was confirmed by the $^{119}$Sn-NMR spectra, showing a signal at −83.72 ppm attributed to the Sn—Sn moieties (FIG. 37). In a similar manner, the formation of Se—Se and Ge—Ge can be realized (FIGS. 11 and 12). When the ammonium salt $NHEt_3Cl$ reacted with 5', dihydrogen gas was released, confirmed by the online gas chromatography (FIGS. 13, 15A-15C). A clean generation of $NEt_3$ was observed from the $^1$H NMR spectra (FIG. 14). When using sodium naphthalene as the reducing reagents in these reactions, the coupling products can't be obtained.

Additionally, compound 5' can achieve reductive reactions on nitrogen-containing aromatic compounds. The reaction of pyridine and 5' afforded the C—C coupling product, 4,4'-bipyridine, in 24% isolated yield after quenching with methanol (FIG. 16). Furthermore, compound 5' can promote Birch reduction of acridine, generating 9,10-dihydroacridine in a 58% isolated yield (FIG. 17). These two reactions can't be realized using sodium naphthalene as a reducing reagent.

Figure 38:
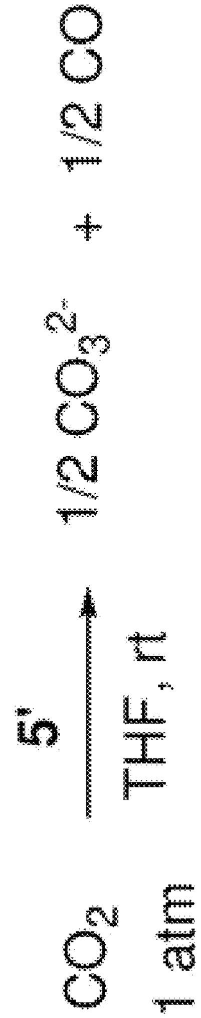
FIG. 38 is a schematic diagram illustrating the reaction of 5' and $CO_2$ (1 atm) in THF.
Figure 39:
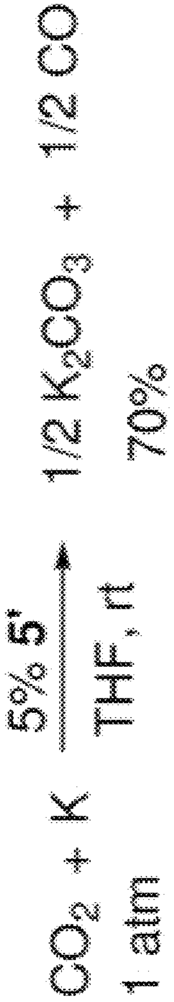
FIG. 39 is a schematic diagram illustrating the reaction of $CO_2$ (1 atm) and K in the presence of 5 mol % of 5' in THF.
Figure 40:
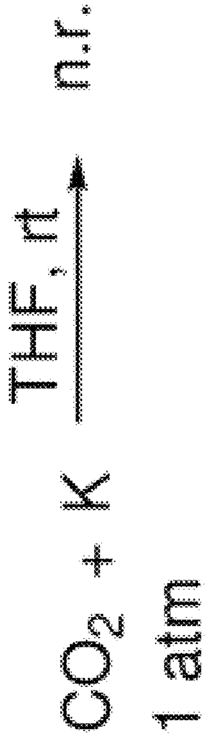
FIG. 40 is a schematic diagram illustrating the reaction of $CO_2$ (1 atm) and K without 5' in THF.

Finally, the two-electron reduction of $CO_2$ was also examined. The reaction of compound 5' and an excess of $CO_2$ (1 atm) was conducted at room temperature in THF solution (FIG. 38). This reaction generated $CO_3^{2-}$, confirmed by the $^{13}$C-NMR (FIG. 19), and CO as the final product, characterized by the online gas chromatography (FIGS. 18A and 18B). Notably, this reaction can be performed in a catalytic fashion, where 5 mol % 5' was added to the potassium in THE with 1.2 equiv. $CO_2$(1 atm), affording $K_2CO_3$ in 70% yield (FIG. 39). In the absence of 5', potassium was barely consumed under $CO_2$ (1 atm) after one week (FIG. 40). Without wishing to be bound by theory, it is believed that the present disclosure represents a rare example of transition-metal-free system for the selective reduction of $CO_2$ into CO.

The invention has been given by way of example only, and various other modifications of and/or alterations to the described embodiment may be made by persons skilled in the art without departing from the scope of the invention as specified in the appended claims.

The invention claimed is:

1. A compound of Formula (I):

Formula (I)

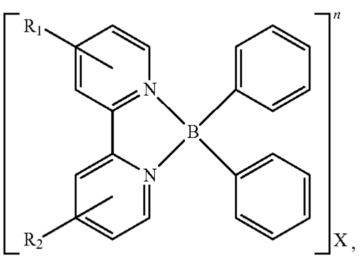

wherein $R_1$ and $R_2$ are each independently selected from the group consisting of hydrogen, alkly, and alkoxy; n is an integer of 0 or −1; and X, if present, is a counterion.

2. The compound of Formula (I) as claimed in claim 1, wherein $R_1$ and $R_2$ are each independently selected from the group consisting of hydrogen, C1-C5 linear or branched alkyl, and C1-C5 alkoxy.

3. The compound of Formula (I) as claimed in claim 1 comprising a structure of Formula (IA):

Formula (IA)

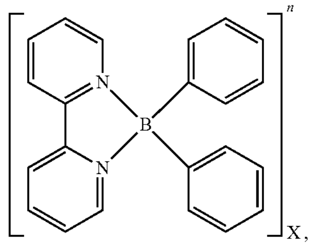

wherein n is 0 or −1; and X, if present, comprises a positive counterion.

4. The compound of Formula (I) as claimed in claim 3 comprising a structure of Formula (II):

Formula (II)

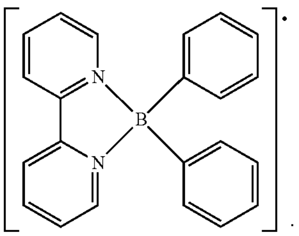

5. The compound of Formula (I) as claimed in claim 3 comprising a structure of Formula (III):

Formula (III)

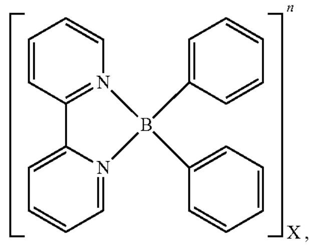

with X being the positive counterion.

6. The compound of Formula (I) as claimed in claim 5 comprising a structure of Formula (IIIA) or Formula (IIIB):

Formula (IIIA)

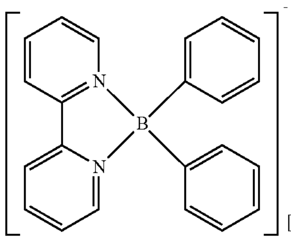

$[Li(THF)_4]^+$, or

-continued

Formula (IIIB)

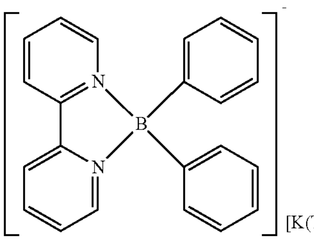
$[K(THF)_2]^+$.

7. A method for preparing the compound of Formula (I) as claimed in claim 1 comprising:

providing a reaction mixture comprising a precursor compound having a structure of Formula (IV), and a synthetic solvent selected from the group consisting of THF and toluene:

Formula (IV)

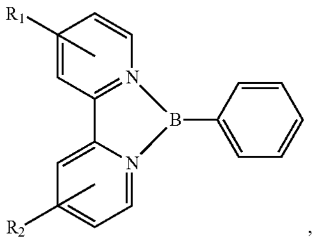
, with $R_1$ and $R_2$ each being independently selected from the group consisting of hydrogen, alkyl, and alkoxy; and stirring the reaction mixture at a predetermined temperature to allow the precursor compound to convert into an organoboron compound.

8. The method as claimed in claim 7, wherein the precursor compound has a structure of Formula (IVA):

Formula (IVA)

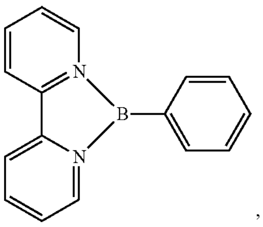
, the synthetic solvent is toluene, and the reaction mixture further comprises phenyllithium;

wherein said stirring occurs at room temperature for at least 8 hours to form the organoboron compound having a structure of Formula (II):

Formula (II)

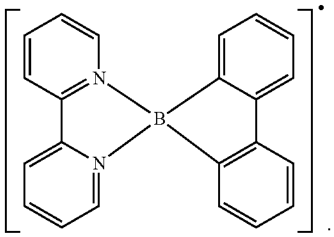
.

9. The method as claimed in claim 8, wherein the precursor compound and phenyllithium have a molar ratio of about 1:1.5.

10. The method as claimed in claim 7, wherein the precursor compound has a structure of Formula (IVA):

Formula (IVA)

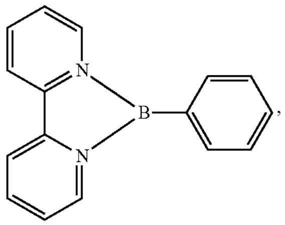
, the synthetic solvent is THE, and the reaction mixture further comprises phenyllithium;

wherein said stirring occurs at room temperature for at least 8 hours to form an organoboron compound having a structure of Formula (IIIA);

Formula (IIIA)

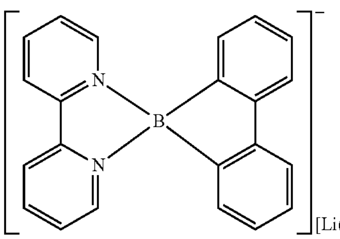
$[Li(THF)_4]^+$.

11. The method as claimed in claim 10, wherein the first precursor compound and phenyllithium have a molar ratio of about 1:1.

12. The method as claimed in claim 10, wherein the method further includes converting the organoboron compound having the structure of Formula (IIIA) into an organoboron compound having a structure of Formula (II):

Formula (II)

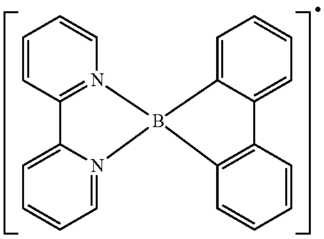

, and which includes stirring the organoboron compound having the structure of Formula (IIIA) with toluene at room temperature for at least 8 hours.

13. The method as claimed in claim 8, wherein the method further includes converting the organoboron compound having the structure of Formula (II) into an organoboron compound having a structure of Formula (IIIB):

Formula (IIIB)

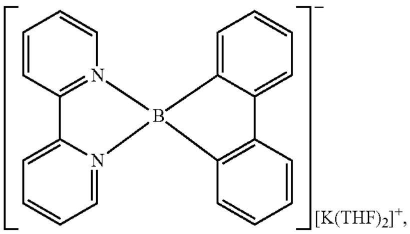

, which includes stirring an organoboron compound having a structure of Formula (IIIA):

Formula (IIIA)

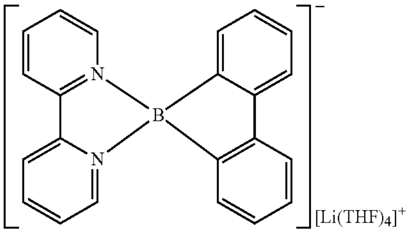

with potassium and THE at room temperature for at least 8 hours.

14. The method as claimed in claim 13, wherein the organoboron compound having the structure of Formula (II) and potassium have a molar ratio of about 1:2.

15. The method as claimed in claim 13, wherein the method further includes reversibly converting the organoboron compound having the structure of Formula (IIIB) to the organoboron compound having the structure of Formula (II), which includes stirring the organoboron compound having the structure of Formula (IIIB) with toluene at a temperature of about 70°C to about 80°C for at least 8 hours.

* * * * *